United States Patent
Ohara

(10) Patent No.: US 9,832,371 B2
(45) Date of Patent: Nov. 28, 2017

(54) IMAGING DEVICE AND METHOD FOR CONTROLLING IMAGING DEVICE

(71) Applicant: JVC KENWOOD Corporation, Yokohama-shi, Kanagawa (JP)

(72) Inventor: Mizuki Ohara, Yokohama (JP)

(73) Assignee: JVC KENWOOD Corporation, Kanagawa (JP)

( * ) Notice: Subject to any disclaimer, the term of this patent is extended or adjusted under 35 U.S.C. 154(b) by 0 days.

(21) Appl. No.: 14/989,172

(22) Filed: Jan. 6, 2016

(65) Prior Publication Data

US 2016/0119535 A1    Apr. 28, 2016

Related U.S. Application Data

(63) Continuation of application No. PCT/JP2014/070270, filed on Jul. 31, 2014.

(30) Foreign Application Priority Data

Sep. 10, 2013  (JP) .................. 2013-187662

(51) Int. Cl.
*H04N 5/228* (2006.01)
*H04N 5/232* (2006.01)
*G06K 9/00* (2006.01)

(52) U.S. Cl.
CPC ..... *H04N 5/23219* (2013.01); *G06K 9/00228* (2013.01); *G06K 9/00255* (2013.01); *G06K 9/00288* (2013.01); *G06T 2207/10004* (2013.01); *G06T 2207/30201* (2013.01)

(58) Field of Classification Search
None
See application file for complete search history.

(56) References Cited

U.S. PATENT DOCUMENTS

| 2006/0061598 | A1* | 3/2006 | Mino ................. G06K 9/00228 345/629 |
| 2011/0293148 | A1 | 12/2011 | Kobayashi |
| 2012/0147170 | A1 | 6/2012 | Takimoto et al. |
| 2012/0148160 | A1* | 6/2012 | Swaminathan .... G06K 9/00281 382/195 |

FOREIGN PATENT DOCUMENTS

| JP | 2008-252713 | 10/2008 |
| JP | 2009-004873 | 1/2009 |
| JP | 2011-035634 | 2/2011 |
| JP | 2011-248548 | 12/2011 |
| JP | 2012-123218 | 6/2012 |

OTHER PUBLICATIONS

International Search Report for International Patent Application No. PCT/JP2014/070270 dated Nov. 4, 2014, 2 pages.

* cited by examiner

*Primary Examiner* — Stephen Coleman
(74) *Attorney, Agent, or Firm* — Amin, Turocy & Watson LLP

(57) ABSTRACT

An imaging device includes an imaging unit configured to image an object and output a captured image, a face recognition unit configured to recognize a face included in the captured image and detect a direction and a position of the recognized face, and a group detection unit configured to detect a group formed by the faces included in the captured image based on directions and positions of two faces being adjacent to each other among the faces included in the captured image.

13 Claims, 20 Drawing Sheets

IMAGING DEVICE AND METHOD FOR CONTROLLING IMAGING DEVICE

CROSS-REFERENCE TO RELATED APPLICATION(S)

This application is a continuation of PCT international application Ser. No. PCT/JP2014/070270 filed on Jul. 31, 2014 which designates the United States, incorporated herein by reference, and which claims the benefit of priority from Japanese Patent Application No. 2013-187662, filed on Sep. 10, 2013.

BACKGROUND OF THE INVENTION

1. Field of the Invention

The present invention relates to an imaging device and a method for controlling the imaging device.

2. Description of the Related Art

In the past, imaging devices have been known, such as one that processes a captured image in which an object is imaged to recognize a human face in the captured image and automatically focuses on the recognized human face. Additionally, an imaging device that follows a particular face recognized in the captured image has also been known.

Meanwhile, Japanese Laid-open Patent Publication No. 2009-004873 discloses a camera controlling system capable of capturing an image of a whole group constituted by a plurality of objects being close to each other, or capturing an image of a combination of only the objects within the group. In Japanese Laid-open Patent Publication No. 2009-004873, the aforementioned face recognition technology can be applied as a technique to identify the object.

When a group is constituted by a plurality of persons included in a captured image as objects, it is considered that a certain relationship is present among the plurality of persons included in the group. The technique described in Japanese Laid-open Patent Publication No. 2009-004873 forms a group based on a distance between the objects obtained from the sizes of the objects.

However, there has been a problem in that the distance between the objects does not serve as an adequate factor for determining whether a certain relationship is present between the respective objects. For example, in a case where two persons being extremely close to each other are back to back each other, it is considered to be difficult to determine, from an image thereof, that a certain relationship is present between these two persons.

SUMMARY OF THE INVENTION

It is an object of the present invention to at least partially solve the problems in the conventional technology.

An imaging device includes an imaging unit configured to image an object and output a captured image, a face recognition unit configured to recognize a face included in the captured image and detect a direction and a position of the recognized face, and a group detection unit configured to detect a group formed by the faces included in the captured image based on directions and positions of two faces being adjacent to each other among the faces included in the captured image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of an imaging device and a method for controlling the imaging device according to the present invention will be hereinafter described with reference to the drawings. Specific values, configurations of external appearances, and the like indicated in the embodiments are used merely as a way of example to facilitate understanding of the invention, and unless otherwise noted herein, the invention is not limited thereto. Detailed descriptions and drawings of elements not directly relating to the invention are omitted.

First Embodiment

Figure 1:
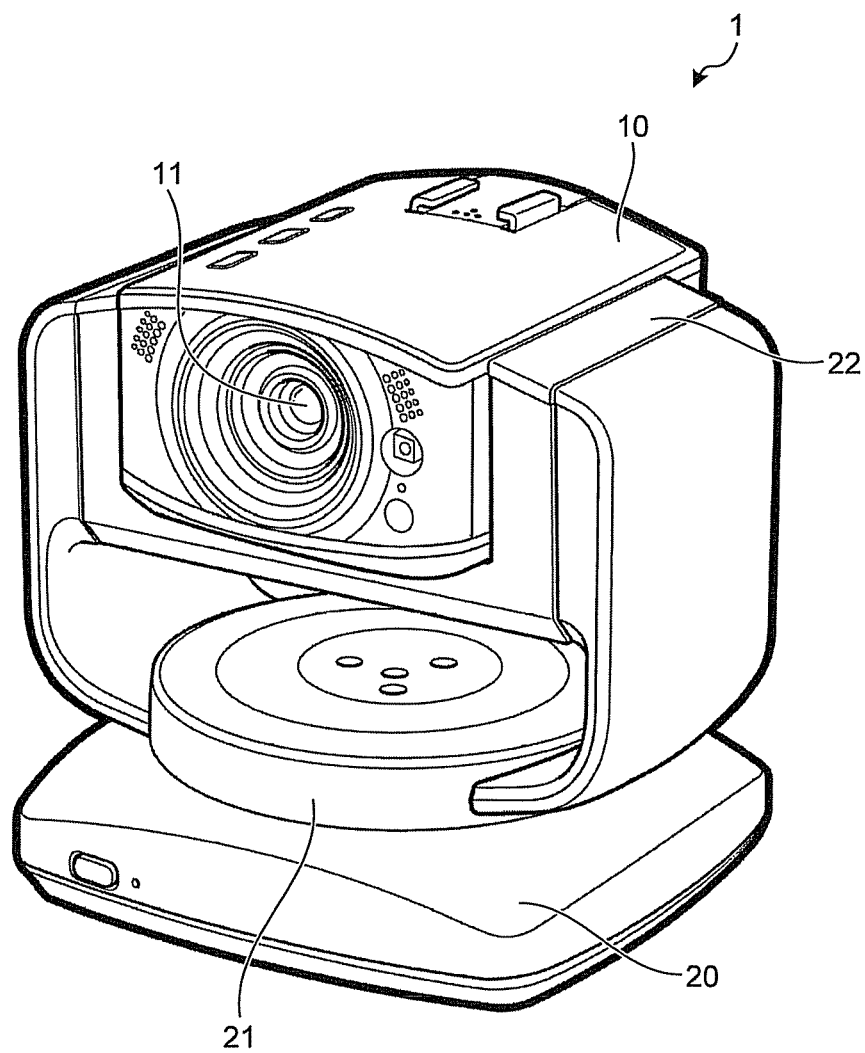
FIG. 1 is a view illustrating an exemplary external appearance of a camera serving as an imaging device according to each of embodiments.

First, a first embodiment will be described. FIG. 1 is a view illustrating an exemplary external appearance of a camera 1 serving as an imaging device according to each of embodiments. The camera 1 includes a camera main body 10 and a base 20. The camera main body 10 includes an imaging lens 11. The camera main body 10 converts light from an object, which enters the imaging lens 11, to an electric signal to carry out predetermined signal processing on the electric signal. As a result, a captured image which is a video of digital data is obtained. The captured image, on which the predetermined image processing is carried out, is output to the outside of the camera main body 10 as an output image 121, for example.

The base 20 rotatably supports the camera main body 10 in horizontal and vertical directions with a horizontal rotation unit 21 and a vertical rotation unit 22, respectively. The horizontal rotation unit 21 and the vertical rotation unit 22 are driven in accordance with control, for example, from the camera main body 10 for rotating the camera main body 10 in the horizontal and vertical directions within a predetermined angle range. The horizontal rotation unit 21 and the vertical rotation unit 22 can be driven by a control signal from the outside.

Figure 2:
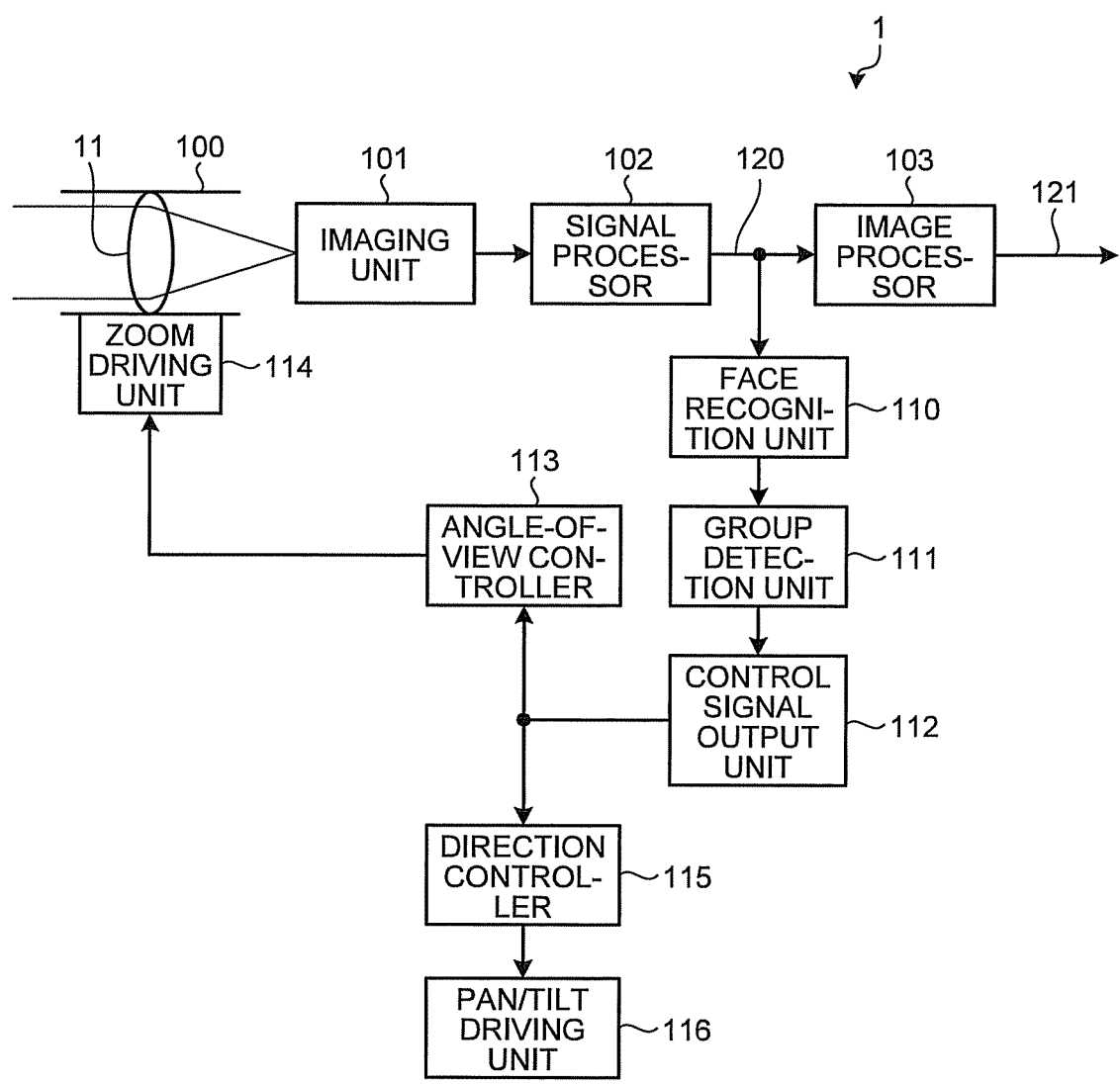
FIG. 2 is a block diagram illustrating an exemplary configuration of a camera according to each of the embodiments.

FIG. 2 illustrates an exemplary configuration of the camera 1 according to each of the embodiments. The camera 1 includes an optical unit 100, an imaging unit 101, a signal processor 102, an image processor 103, a zoom driving unit 114, and a pan/tilt driving unit 116.

The optical unit 100 includes the imaging lens 11 having one or more lenses, a lens driving mechanism for driving the imaging lens 11, and the like. The light from the object enters the imaging lens 11 to be output to the imaging unit 101 through the optical unit 100. The imaging unit 101 includes an imaging element such as a charge coupled device (CCD) imager or a complementary metal oxide semiconductor (CMOS) imager, and photoelectrically converts, to the electric signal, the light entering from the optical unit 100 to output the electric signal.

The signal output from the imaging unit 101 in accordance with the light entering the imaging unit 101 is supplied to the signal processor 102. The signal processor 102 carries out the predetermined signal processing such as noise elimination processing and gain adjustment processing on the signal supplied from the imaging unit 101, and converts the signal to the digital data through A/D conversion. The signal processor 102 then outputs the digital data as a captured image 120 to supply to the image processor 103 and a face recognition unit 110 described later. The signal processor 102 may be included in the imaging unit 101. The image processor 103 carries out the image processing such as white balance correction processing and gamma correction processing on the captured image 120 supplied from the signal processor 102 and outputs the captured image 120 to the outside of the camera 1 as the output image 121. The camera 1 is not limited to the configuration above and may include a storage unit such as a memory to hold, in the memory, the output image 121 output from the image processor 103.

The zoom driving unit 114 drives the lens driving mechanism in accordance with an angle-of-view control signal from an angle-of-view controller 113 described later to control an angle of view of the imaging lens 11, and carries out zoom operation between a wide end (wide-angle end) and a telephoto end (narrow-angle end). The pan/tilt driving unit 116 drives the horizontal rotation unit 21 and the vertical rotation unit 22 in accordance with a direction control signal from a direction controller 115 described later to change an imaging direction of the imaging lens 11.

The camera 1 further includes the face recognition unit 110, a group detection unit 111, a control signal output unit 112, the angle-of-view controller 113, and the direction controller 115.

The face recognition unit 110 recognizes a face included in the captured image 120 supplied from the signal processor 102. The face recognition unit 110 can use a known method to recognize a face included in the captured image 120. For example, it is considered that, in the face recognition, the face recognition unit 110 uses a subspace method using a face dictionary and pattern matching to detect a face region and respective facial organs in the captured image 120. The face recognition unit 110 also detects a direction in which the face recognized in the captured image 120 looks. For example, based on positional relationships between the face region and the respective facial organs (e.g. an eye, a nose, and a mouth) of the recognized face, the face recognition unit 110 can detect a direction in which that face looks.

In accordance with a face recognition result, for example, the face recognition unit 110 outputs face position information indicating a position of each of the recognized faces on the captured image 120, and face direction information indicating a direction of each of the faces. Additionally, the face recognition unit 110 outputs the captured image 120 on which the face recognition has been carried out. The face position information, the face direction information, and the captured image 120, which have been output from the face recognition unit 110, are supplied to the group detection unit 111.

Based on the face position information, the face direction information, and the captured image 120 which are supplied from the face recognition unit 110, the group detection unit 111 detects a group including a set of the respective faces recognized in the captured image 120. The group detection unit 111 supplies information on the set of the faces included in the detected group and the captured image 120 to the control signal output unit 112.

Based on the information on the set of the faces included in the group and the captured image 120, which are supplied from the group detection unit 111, the control signal output unit 112 obtains a direction of the group relative to the camera 1. For example, based on the respective faces included in the group, the group detection unit 111 obtains a center-of-gravity position of that group according to the faces. The control signal output unit 112 obtains, as a direction of the group, a direction from the imaging lens 11 of the camera 1 toward the obtained center-of-gravity position, for example, and outputs the information indicating the direction.

Figure 3:
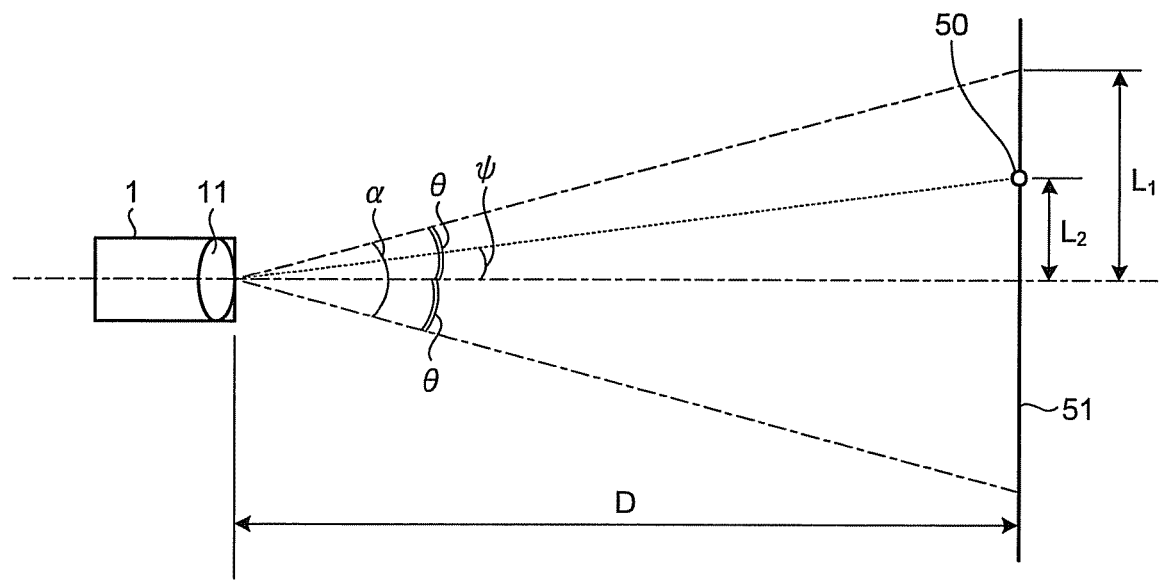
FIG. 3 is a diagram for explaining an exemplary method for obtaining a direction from an imaging lens according to each of the embodiments.

As illustrated in FIG. 3 as an example, an imaginary imaging plane 51 corresponding to the image captured by the camera 1 is considered and a center-of-gravity position 50 is assumed as a point on the imaging plane 51. The imaginary imaging plane 51 corresponds to an effective pixel region 202 described later in FIG. 4, for example. Meanwhile, a distance between the camera 1 and the imaging plane 51 is assumed as a distance D. The control signal output unit 112 acquires an angle of view $\alpha$ of the imaging lens 11 from the angle-of-view controller 113 described later. The control signal output unit 112 also acquires a distance $L_1$ and a distance $L_2$ from the captured image. The distance $L_1$ indicates a distance on the imaging plane 51 from the center of the captured image to an end in the horizontal direction, whereas the distance $L_2$ indicates a distance on the imaging plane 51 from the center of the captured image to the center-of-gravity position.

Additionally, from an angle $\theta$, which is an angle of half the angle of view $\alpha$, and the respective distances D, $L_1$, and $L_2$, the control signal output unit 112 obtains a direction angle $\psi$ indicating a direction of the camera 1 toward the center-of-gravity position using the following formula (1). Note that the distance D does not appear in the formula (1) because the distance D is canceled out in the derivation process of the formula (1).

$$\phi = \tan^{-1}\{(L_2/L_1) \tan \theta\} \quad (1)$$

Here, the control signal output unit 112 is described to obtain the center-of-gravity position of the group as the information indicating the direction of the group. However, this process is merely an example and is not limited to the example. Practically, the control signal output unit 112 individually obtains information indicating directions of respective faces constituting both ends of the group in the horizontal direction to output as the information indicating the direction of the group along with the information indicating the direction of the center-of-gravity position of the group.

The information indicating the direction of the group, which has been output from the control signal output unit 112, is supplied to the angle-of-view controller 113 and the direction controller 115. The angle-of-view controller 113 drives the zoom driving unit 114 based on the supplied information and controls the angle of view of the imaging lens 11 to set to a predetermined angle of view. For example, based on the information indicating the direction of the group, which is supplied from the control signal output unit 112, the angle-of-view controller 113 calculates the angle of view. The angle-of-view controller 113 then drives the zoom driving unit 114 to carry out the zoom operation such that the angle of view of the imaging lens 11 is set to the calculated angle of view.

Based on the supplied information, the direction controller 115 drives the pan/tilt driving unit 116 to rotate the horizontal rotation unit 21 and the vertical rotation unit 22, and controls the camera 1 such that the imaging direction thereof looks in a predetermined direction. For example, based on the information indicating the direction of the group, which is supplied from the control signal output unit 112, the direction controller 115 calculates a changed amount in the imaging direction. The direction controller 115 then drives the pan/tilt driving unit 116 to carry out pan operation such that the imaging direction of the camera 1 is changed by the calculated changed amount. Note that the pan operation in which the imaging direction is changed in the horizontal direction and tilt operation in which the imaging direction is changed in the vertical direction are collectively referred to as pan operation herein.

Definition of terms

Figure 4:
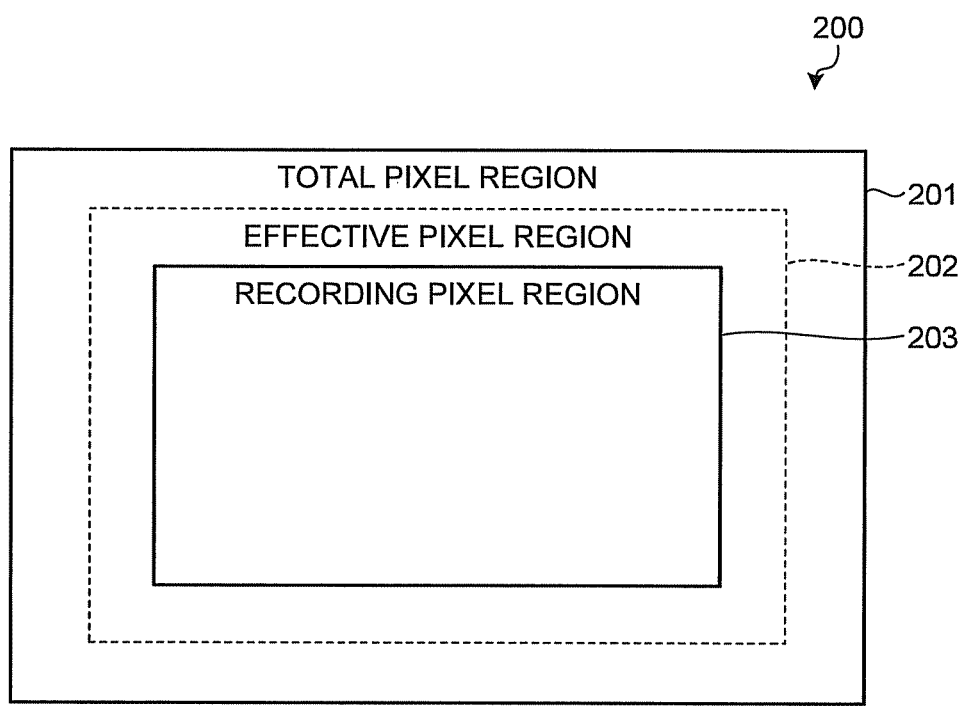
FIG. 4 is a view illustrating an exemplary imaging region of an imaging element according to each of the embodiments.

Next, the group detection according to the first embodiment will be described further in detail. First, before starting the description of the group detection, respective terms and symbols on the drawings used in the following description will be defined. FIG. 4 illustrates an example of an imaging region of the imaging element included in the imaging unit 101. In FIG. 4, an imaging element 200 includes, as a pixel region, a total pixel region 201 and the effective pixel region 202. The total pixel region 201 includes all pixels on the imaging element 200, whereas the effective pixel region 202 serves as a region that can be processed as an image signal within the total pixel region 201. In the total pixel region 201, a region other than the effective pixel region 202 cannot be used as a region for which the image signal is output, as in the case of an optical black region. Additionally, a recording pixel region 203 is an image region which is processed as the output image 121 within the effective pixel region 202.

For example, the image signal corresponding to the whole area of the effective pixel region 202 is output from the imaging unit 101. The signal processor 102 carries out the predetermined signal processing on the image signal supplied from the imaging unit 101 and outputs, as the captured image 120, an image including all the pixels in the effective pixel region 202. The image processor 103 cuts out the pixels located in a region corresponding to the recording pixel region 203 from the captured image 120 supplied from the signal processor 102 to output as the output image 121.

Figure 5:
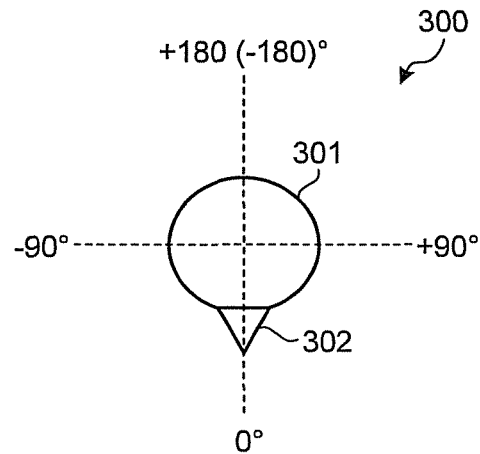
FIG. 5 is a diagram illustrating an exemplary display of a face according to a first embodiment.

FIG. 5 illustrates an exemplary display of a face according to the first embodiment. FIG. 5 represents the face 300 when viewed from right above. In FIG. 5, the face 300 is schematically expressed by a head 301 and a nose 302. In the face 300, a direction in which the nose 302 looks is defined as front and the front is defined as angle $\phi = 0°$. Additionally, in the drawings, the angle is changed counterclockwise in a positive direction from 0° to 180° and changed clockwise in a negative direction from 0° to −180°.

Figure 6A:
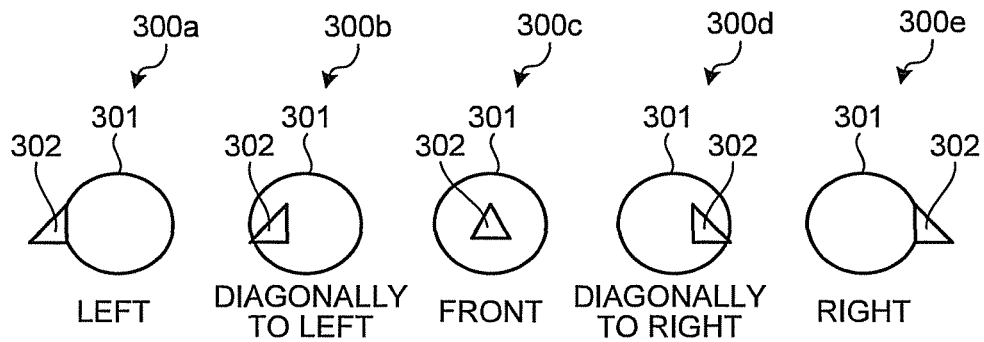
FIGS. 6A and 6B are diagrams for explaining a definition of a direction of the face.
Figure 6B:
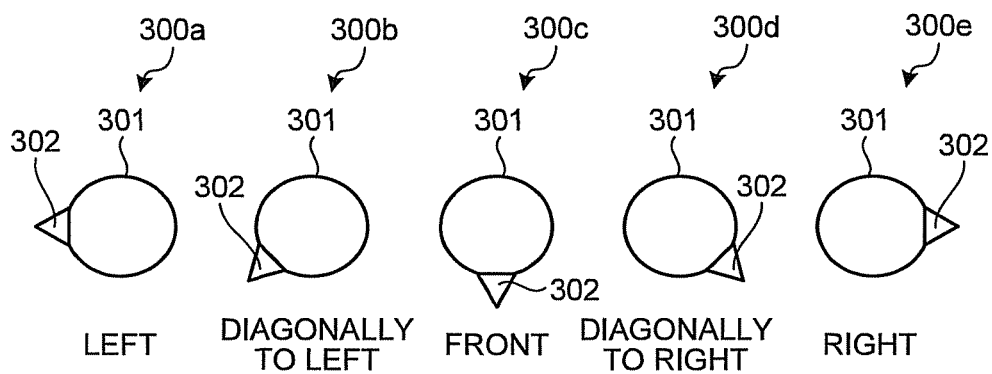

FIGS. 6A and 6B illustrate a definition of the direction of the face in the following description. FIG. 6A illustrates an example when the face is viewed from the camera 1. FIG. 6B illustrates exemplary directions when the face is viewed from right above. In FIG. 6B, it is assumed that the camera 1 is set at a lower part in the drawing and the imaging lens 11 looks upward. As illustrated in FIGS. 6A and 6B, the direction of the face is hereinafter defined by the direction of the nose 302 relative to the head 301 when viewed from the camera 1.

For example, as illustrated in the face 300c in FIGS. 6A and 6B, in a case where the nose 302 is located substantially at the center of the head 301, the face 300c is assumed to look to the front. Likewise, as illustrated in the face 300a in FIGS. 6A and 6B, in a case where the nose 302 is seen on the left side of the head 301, the face 300a is assumed to look to the left. As illustrated in the face 300b, in a case where the nose 302 is seen shifted to the left side of the head 301, the face 300b is assumed to look diagonally to the left. Hereinafter, the face 300a looking to the left and the face 300b looking diagonally to the left are not distinguished and both of the face 300a and the face 300b are assumed to look to the left.

The same applies to the face 300d and the face 300e looking to the right. That is, the face 300d looking diagonally to the right and the face 300e looking to the right are not distinguished and both of the face 300d and the face 300e are assumed to look to the right.

Figure 7:
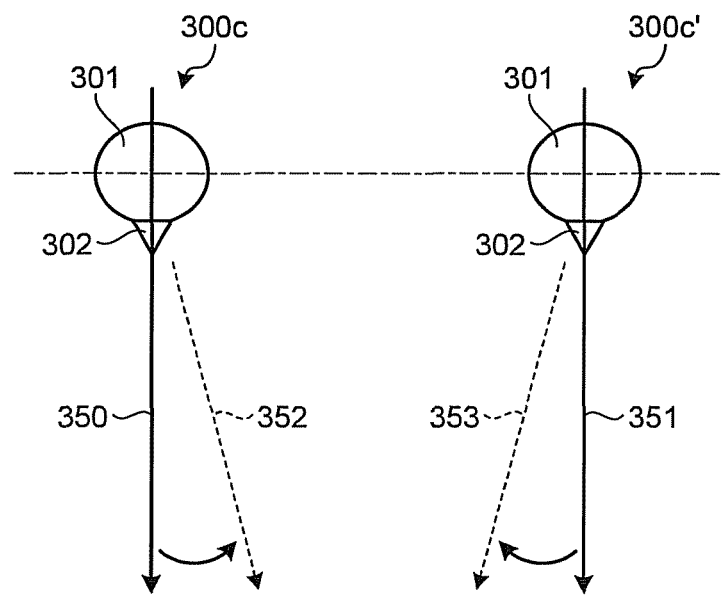
FIG. 7 is a diagram for explaining the definition of the direction of the face.

In the case of two faces being side by side, two states are defined for these two faces; namely, a face-to-face state and a non-face-to-face state. These two states will be described with reference to FIG. 7. FIG. 7 illustrates an example of the two faces being side by side when the faces are viewed from above. As exemplified in FIG. 7, when the face 300c and a face 300c' look in directions 350 and 351, respectively, which are parallel to each other, the faces 300c and 300c' are in the non-face-to-face state. On the other hand, when the face 300c and the face 300c' look in an inner direction 352 relative to the direction 350 and in an inner direction 353 relative to the direction 351, respectively, the faces 300c and 300c' are in the face-to-face state.

Practically, it is preferable that, by providing a margin in the directions that are assumed as being parallel to each other, the two faces be assumed as being parallel even when the directions of the two faces vary within a predetermined range apart from being parallel.

A relationship between the imaging range of the camera 1 and the position of the face will be described with reference to FIGS. 8 and 9. The signal processor 102 obtains, from the image signal supplied from the imaging unit 101, the captured image 120 corresponding to the effective pixel region 202 in a range of the angle of view of the imaging lens 11. As described above, the recording pixel region 203 which is smaller in area than the effective pixel region 202 is cut from the captured image 120 constituted by the effective pixel region 202 through the image processing by the image processor 103, and an image corresponding to the recording pixel region 203 then serves as the output image 121.

Figure 8:
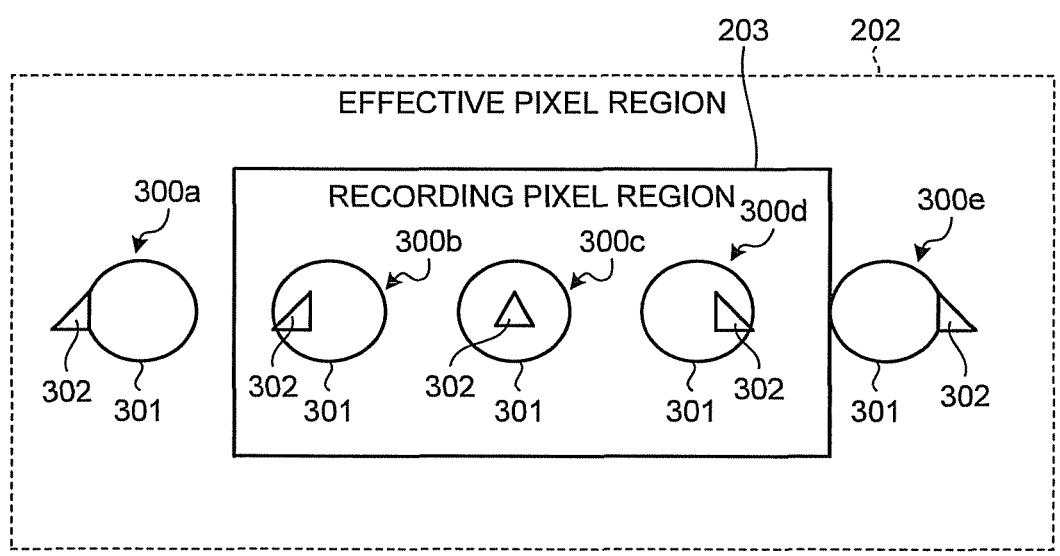
FIG. 8 is a diagram for explaining a relationship between an imaging range of the camera and a position of the face.

Here, as exemplified in FIG. 8, a case where five faces 300a to 300e are imaged within the effective pixel region 202, among which the three faces 300b to 300d are included in the recording pixel region 203 will be considered. The captured image 120 output from the signal processor 102 is supplied to the image processor 103 and the face recognition unit 110. Accordingly, the faces 300a and 300e are not included in the output image 121, since the faces 300a and 300e are included in the effective pixel region 202 but not included in the recording pixel region 203. Meanwhile, in the same manner as the faces 300b to 300d included in the recording pixel region 203, the faces 300a and 300e are to be subjected to face recognition processing by the face recognition unit 110 and the group detection processing by the group detection unit 111.

Figure 9:
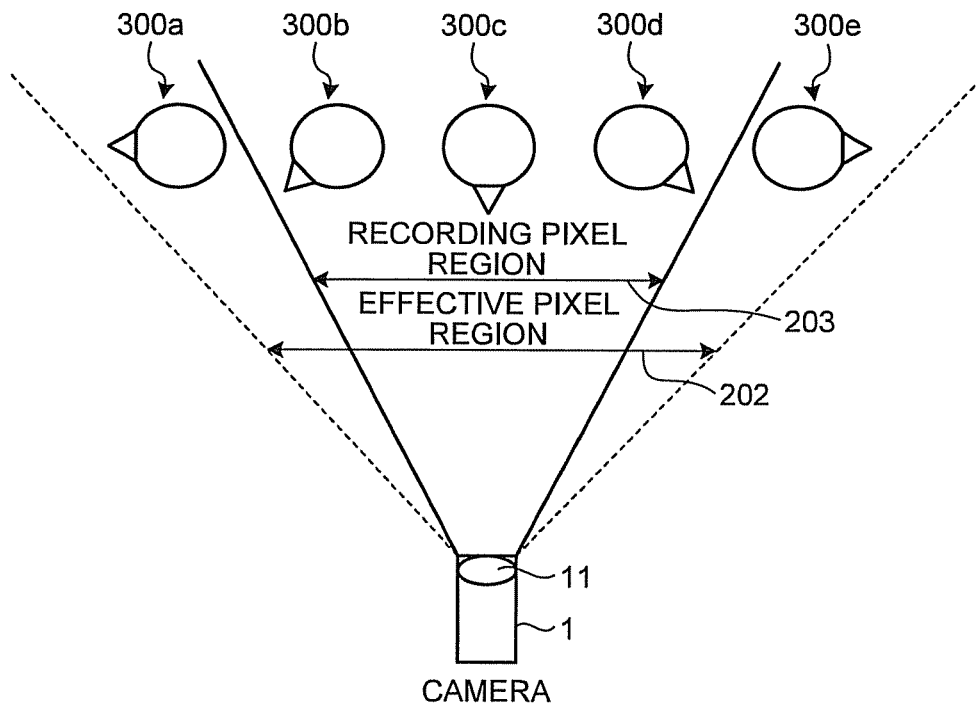
FIG. 9 is a diagram for explaining a relationship between the imaging range of the camera and a position of the face.

FIG. 9 illustrates an example of the respective faces 300a to 300e corresponding to the states thereof in FIG. 8 when viewed from right above. A field 202 of the effective pixel region 202 in the horizontal direction corresponds to the angle of view of the imaging lens 11 (optical unit 100) in the camera 1. A field 203 of the recording pixel region 203 in the horizontal direction is smaller in angle relative to the imaging lens 11 than the angle of view.

Group Detection Processing

Next, a method for detecting a group to which a face belongs according to the first embodiment will be described. In the first embodiment, based on the directions and the positions of two faces being adjacent to each other, the group detection unit 111 detects a group to which the face belongs. More specifically, among faces recognized by the face recognition unit 110 in the captured image 120, that is, the effective pixel region 202, the group detection unit 111 detects, as a group, a set of faces including two faces looking in face-to-face directions on both ends.

Figure 10:
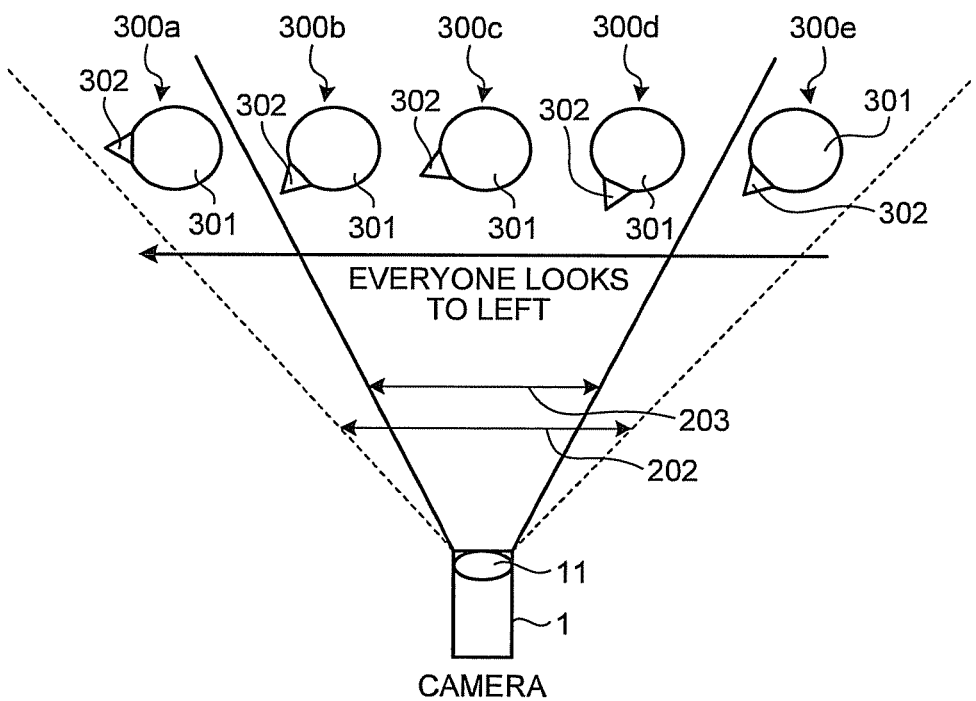
FIG. 10 is a diagram illustrating an example where a group is not formed by respective faces included in an effective pixel region according to the first embodiment.
Figure 11:
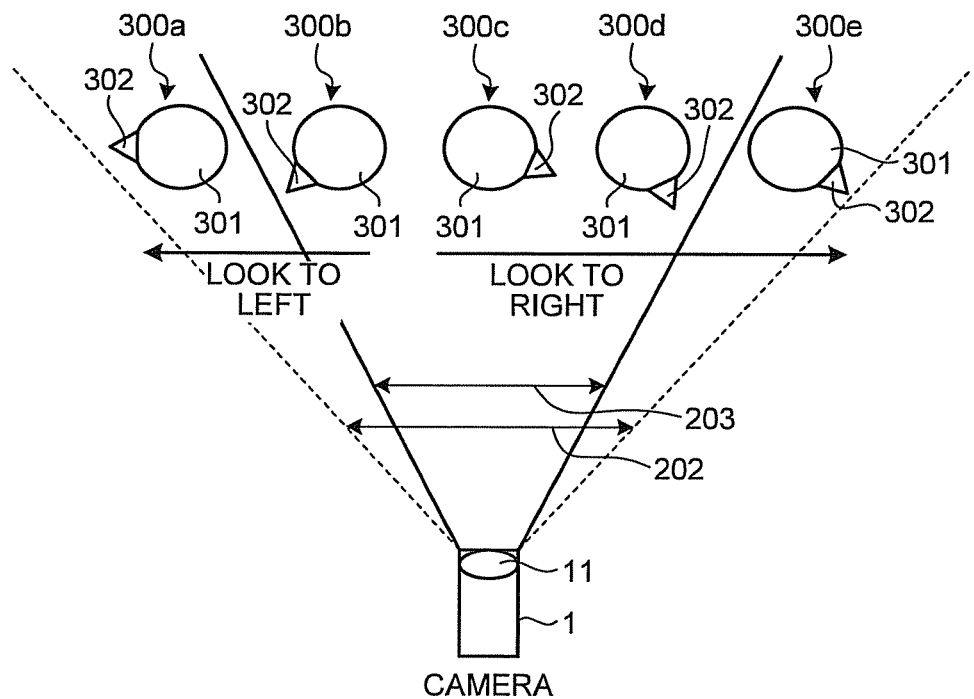
FIG. 11 is a diagram illustrating an example where a group is not formed by the respective faces included in the effective pixel region according to the first embodiment.

FIGS. 10 and 11 illustrate examples where no group is formed by the respective faces 300a to 300e included in the effective pixel region 202 according to the first embodiment. FIG. 10 is an example where all the faces 300a to 300e included in the effective pixel region 202 look to the left. In this case, there is no set of faces looking in the face-to-face directions among the faces 300a to 300e, and thus the group detection unit 111 determines that no group is present.

FIG. 11 is an example where, among the faces 300a to 300e included in the effective pixel region 202, there are faces looking in different directions from one another and no group is formed by the respective faces 300a to 300e. In FIG. 11, the faces 300a and 300b look to the left and the faces 300c to 300e look to the right. Accordingly, there is no set of faces looking in the face-to-face directions, and thus the group detection unit 111 determines that no group is present.

Figure 12:
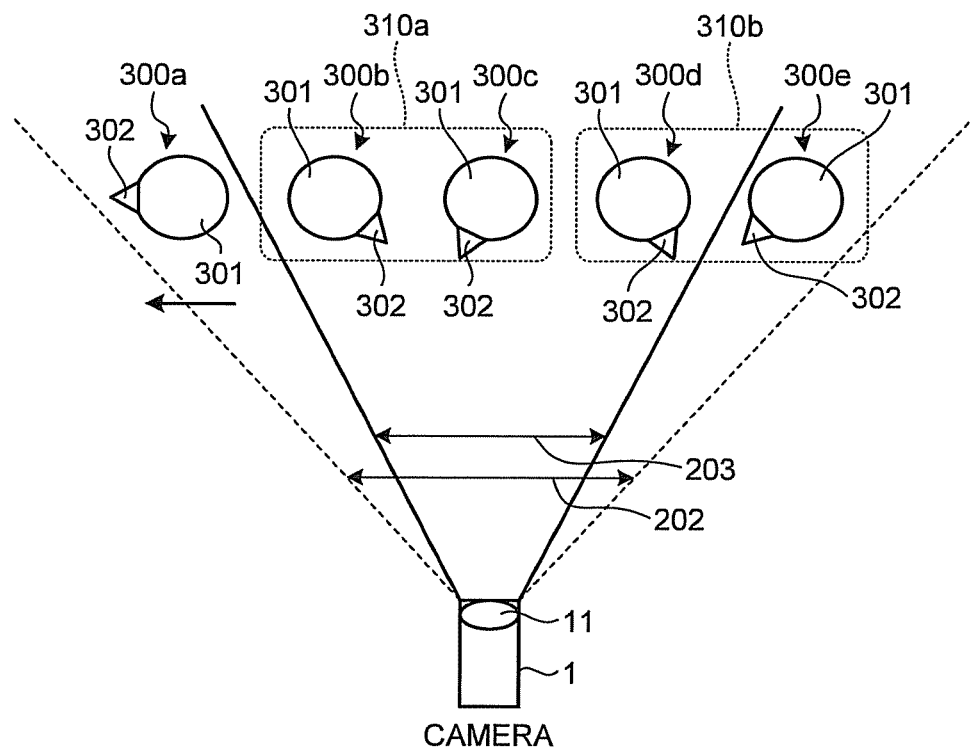
FIG. 12 is a diagram illustrating an example where a group is formed by the respective faces included in the effective pixel region according to the first embodiment.

FIG. 12 illustrates an example where a group is formed by the respective faces 300a to 300e included in the effective pixel region 202 according to the first embodiment. In FIG. 12, based on the face position information and the face direction information supplied from the face recognition unit 110, the group detection unit 111 determines that the face 300b looks to the right whereas the face 300c adjacent to the face 300b looks to the left. As a result, the group detection unit 111 determines that the faces 300b and 300c look in the face-to-face directions. Therefore, the group detection unit 111 detects a group 310a both ends of which are the faces 300b and 300c. Additionally, based on the face position information and the face direction information, the group detection unit 111 determines that the face 300d looks to the right whereas the face 300e adjacent to the face 300d looks to the left. As a result, the group detection unit 111 determines that the faces 300d and 300e look in the face-to-face directions. Therefore, the group detection unit 111 detects a group 310b both ends of which are the faces 300d and 300e.

Meanwhile, based on the face position information and the face direction information, the group detection unit 111 determines that the face 300a looks to the left whereas the face 300b adjacent to the face 300a looks to the right. As a result, the group detection unit 111 determines that the faces 300a and 300b do not look in the face-to-face directions and thus no group is formed thereby. Likewise, the group detection unit 111 determines that the face 300c looks to the left whereas the face 300d adjacent to the face 300c looks to the right. As a result, the group detection unit 111 determines that the faces 300c and 300d do not look in the face-to-face directions and thus no group is formed thereby.

Note that the face looking to the front relative to the camera 1, such as the face 300c in FIG. 9, is not assumed to constitute an end of a group. There is also a case where the face looks upward, downward, or backward relative to the camera 1, and thus no face can be detected. In this case, the faces in these states naturally do not constitute an end of a group since the faces are not detected in the first place.

Figure 13:
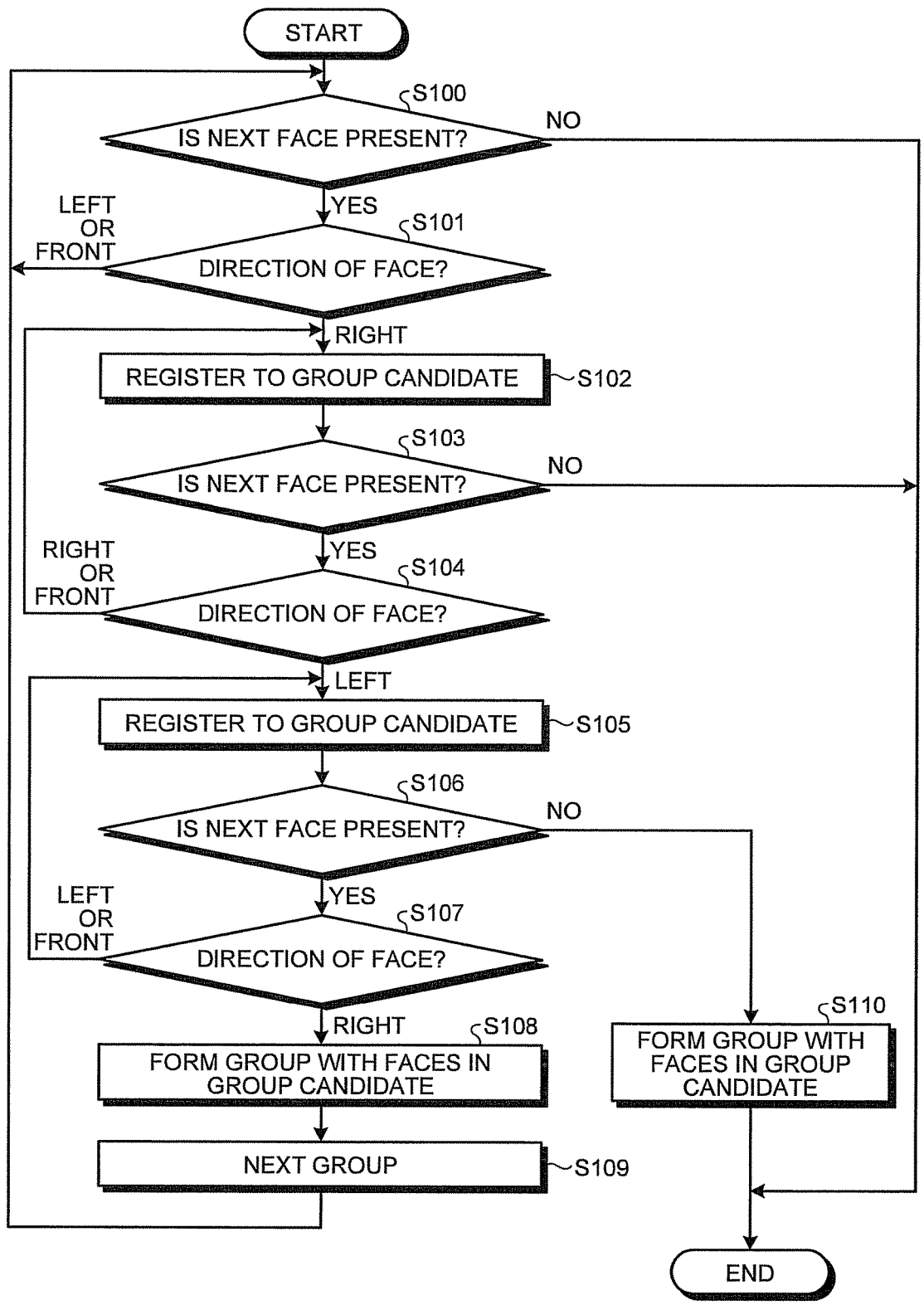
FIG. 13 is a flowchart illustrating an example of group detection processing according to the first embodiment.

FIG. 13 is a flowchart illustrating an example of the group detection processing by the group detection unit 111 according to the first embodiment. The processing using the flowchart in FIG. 13 is repeatedly carried out at a predetermined interval, for example, at an interval of a frame period of the captured image 120. In the first embodiment, the group detection unit 111 sequentially determines the directions of the respective faces from one end of the effective pixel region 202 toward the other end thereof in the horizontal direction to detect a group. In the following example, the group detection unit 111 is assumed to determine the directions of the respective faces from the left end of the effective pixel region 202 toward the right end thereof.

In FIG. 13, the group detection unit 111 determines in step S100 whether a next face to the right of the face currently serving as a target for determination is present. In the case of the processing being carried out on the effective pixel region 202 for the first time, the group detection unit 111 will determine whether any face is present within the effective pixel region 202. When the group detection unit 111 determines that no next face is present, no group is determined to be present within the effective pixel region 202 and accordingly, a series of the processing in the flowchart in FIG. 13 is terminated.

When the group detection unit 111 determines in step S100 that a next face is present, the processing proceeds to step S101 with that next face set as a face of interest. In step S101, the group detection unit 111 determines the direction of the face of interest. When the group detection unit 111 determines that the direction of the face of interest is left or front, the processing returns to step S100.

When the group detection unit 111 determines in step S101 that the direction of the face of interest is right, the processing proceeds to step S102 and that face of interest is registered to a group candidate. The group detection unit 111 subsequently determines in step S103 whether a next face to the right of the face of interest is present. When the group detection unit 111 determines that no next face is present, a series of the processing using the flowchart in FIG. 13 is terminated. In this case, the group candidate to which the face is registered in step S102 is discarded.

When the group detection unit 111 determines in step S103 that a next face is present, the processing proceeds to step S104 with that next face set as a new face of interest. In step S104, the group detection unit 111 determines the direction of the face of interest. When the group detection unit 111 determines that the direction of the face of interest is right or front, the processing returns to step S102 and that face of interest is additionally registered to the group candidate.

When the group detection unit 111 determines in step S104 that the direction of the face of interest is left, the processing proceeds to step S105 and that face of interest is additionally registered to the group candidate. The group detection unit 111 subsequently determines in step S106 whether a next face to the right of the face of interest is present. When the group detection unit 111 determines that no next face is present, the processing proceeds to step S110 and a group is formed by the faces registered in the group candidate. A series of the processing using the flowchart in FIG. 13 is then terminated.

When the group detection unit 111 determines in step S106 that a next face is present, the processing proceeds to step S107 with that next face set as a new face of interest. In step S107, the group detection unit 111 determines the direction of the face of interest. When the group detection unit 111 determines that the direction of the face of interest is left or front, the processing returns to step S105 and that face of interest is additionally registered to the group candidate.

When the group detection unit 111 determines in step S107 that the direction of the face of interest is right, the processing proceeds to step S108 and a group is formed by the faces registered in the group candidate. At this time, the group detection unit 111 adds identification information to the formed group to identify that group. Here, the identification information is assumed as a group number whose value is incremented starting from "1".

The group detection unit 111 increments the group number, for example, by 1 in subsequent step S109 to prepare for the detection processing for a next group. Thereafter, the processing returns to step S100 and the group detection unit 111 determines whether a next face to the right of the face determined to be present in step S106 is present.

The group detection unit 111 can repeatedly carry out the processing using the flowchart in FIG. 13 at a predetermined time interval to detect a group in accordance with change in the direction of the face. For example, in a case where the face 300e is changed to look to the right from the state in FIG. 12 described above, the group detection unit 111 detects a group among the faces 300a to 300e with the face 300e looking to the right. In this case, both of the faces 300d and 300e constituting the group 310b look to the right and thus the group 310b is canceled. Accordingly, the group detection unit 111 only detects the group 310a formed by the faces 300b and 300c based on the flowchart in FIG. 13.

Figure 14:
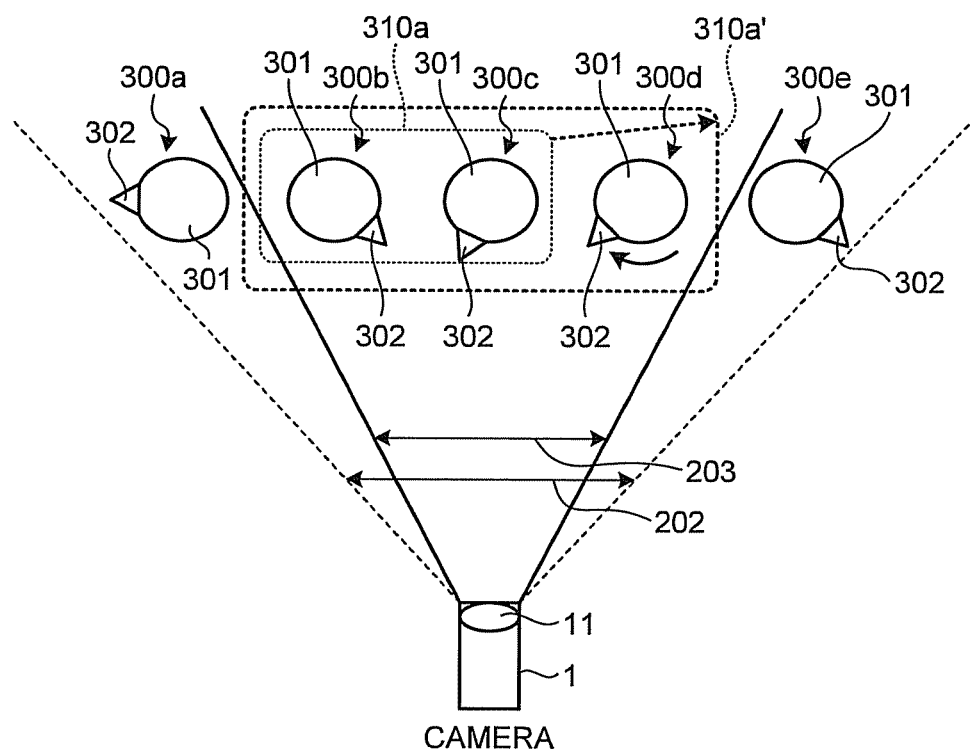
FIG. 14 is a diagram for explaining a group to be extended according to the first embodiment.

On the other hand, in a case where the direction of the face 300d is changed to left from the state in FIG. 12, the group detection unit 111 detects a group among the faces 300a to 300e with the face 300d looking to the left. Specifically, as illustrated in FIG. 14, once the face 300d looks to the left, the faces 300b and 300d look in the face-to-face directions. As a result, the group 310a formed by the faces 300b and 300c is extended and a group 310a' including a set of the faces both ends of which are the faces 300b and 300d is formed. Accordingly, the group detection unit 111 detects the group 310a' formed by the faces 300b, 300c, and 300d based on the flowchart in FIG. 13.

Imaging Operation with Attention Focused on Group

Next, the imaging operation with attention focused on the group according to the first embodiment will be described. In the first embodiment, imaging is carried out with attention focused on the group detected by the group detection unit 111 through the zoom operation and the pan operation.

Figure 15:
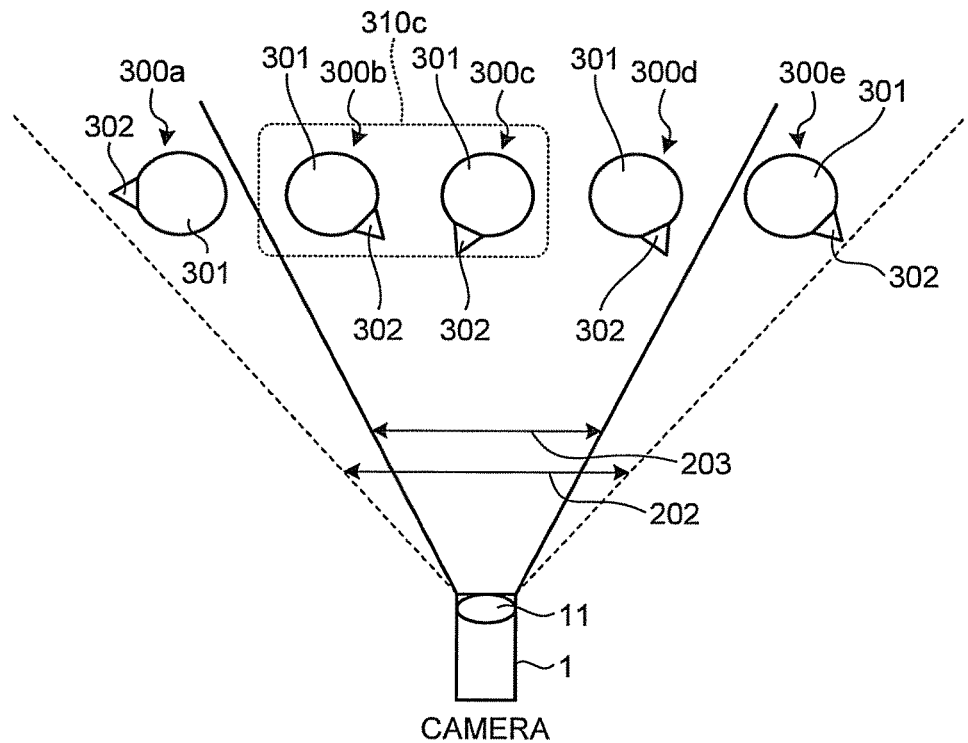
FIG. 15 is a diagram for explaining an imaging operation with attention focused on the group according to the first embodiment.

As illustrated in FIG. 15 as an example, it is assumed that a group 310c is formed by the faces 300b and 300c out of the faces 300a to 300e. In FIG. 15, it is also assumed that the group 310c (faces 300b and 300c) and the face 300d are included in the recording pixel region 203 whereas the faces 300a to 300e are included in the effective pixel region 202.

Figure 16:
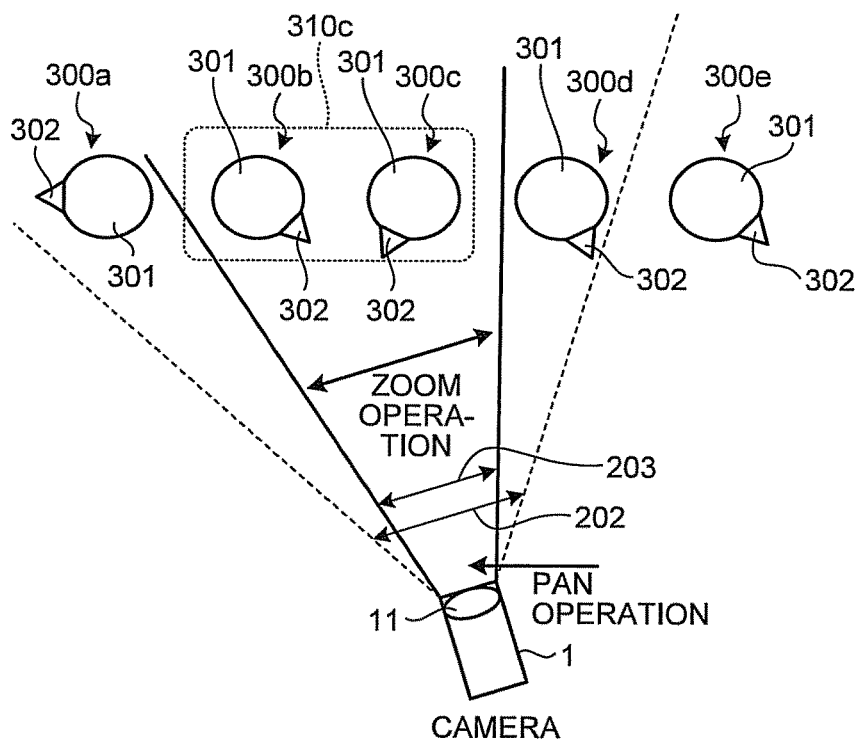
FIG. 16 is a diagram for explaining the imaging operation with attention focused on the group according to the first embodiment.

In this condition, as exemplified in FIG. 16, the camera 1 pans in the direction of the group 310c while the imaging lens 11 zooms to the telephoto end side such that the faces 300b and 300c are included in the recording pixel region 203 and the face 300d is not included therein to carry out imaging in the camera 1. With this, the camera 1 can obtain the output image 121 with attention focused on the group 310c, namely, the faces 300b and 300c.

In this case, the camera 1 may carry out the zoom operation and the pan operation such that the faces 300b and 300c fit within the angle of view at the maximum, or alternatively, by considering a height and a width of each of the faces, the angle of view and the imaging direction may be set such that the face has the width corresponding to a predetermined percentage of the recording pixel region 203. As a result, the camera 1 can image the group in various compositions such as a zoomed-in image of the face, and a bust image.

Figure 17:
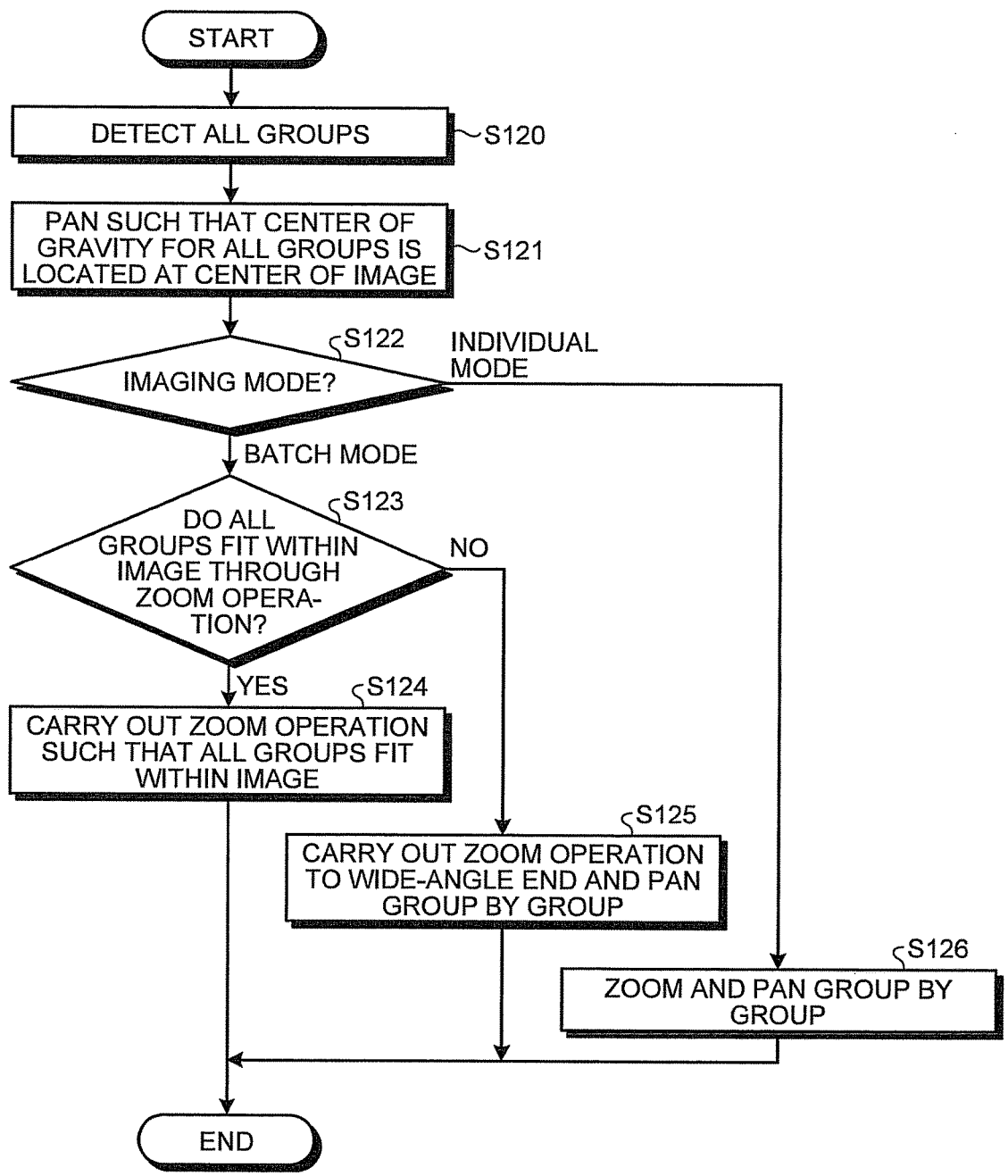
FIG. 17 is a flowchart illustrating an example of the imaging operation with attention focused on the group according to the first embodiment.

FIG. 17 is a flowchart illustrating an example of the imaging operation with attention focused on the group according to the first embodiment. In FIG. 17, the group detection unit 111 detects, in step S120, all groups included in the captured image 120, that is, the effective pixel region 202 based on the flowchart in FIG. 13 described above. Subsequently in step S121, the control signal output unit 112 outputs the control signal for panning such that a center of gravity for all the groups detected in step S120 is located at the center of the output image 121, that is, the recording pixel region 203. Based on the control signal, the direction controller 115 controls the pan/tilt driving unit 116 to change the imaging direction of the camera 1.

For example, in the case of the center of gravity for the group, the center of gravity here is a value obtained by averaging relative positions within the group of the respective faces included in the group. Likewise, the center of gravity for all groups is a value obtained by averaging the centers of gravity for the respective groups.

Subsequently in step S122, the control signal output unit 112 determines whether an imaging mode of the camera 1 is a batch mode or an individual mode. The batch mode is an operation mode for collectively imaging all groups included in the captured image 120. Meanwhile, the individual mode is an operation mode for imaging all groups included in the captured image 120 group by group. Note that the camera 1 can set the imaging mode thereof in accordance with operation of a user on an operation unit (not illustrated) or the like.

When the control signal output unit 112 determines in step S122 that the operation mode of the camera 1 is the batch mode, the processing proceeds to step S123. Based on positions of both ends in all groups, which are constituted by a position of a face at the left end included in a group located leftmost among all the groups, and a position of a face at the right end included in a group located rightmost among all the groups, and also based on the angle of view of the imaging lens 11, the control signal output unit 112 determines in step S123 whether all the groups fit within an image, that is, the recording pixel region 203 through the zoom operation.

For example, it is considered that the control signal output unit 112 obtains an angle of view β of the imaging lens 11 zooming to the wide-angle end, and positions on the imaginary imaging plane 51 corresponding to the positions of both ends in all the groups to use the aforementioned formula (1) for the determination in step S123. In this case, the control signal output unit 112 sets, as a reference, a position of an optical axis of the imaging lens 11 on the imaging plane 51, and defines, as the distance $L_2$, a distance between the optical axis of the imaging lens 11 and a face located farthest from the optical axis among the faces. The angle ψ is then obtained using the aforementioned formula (1). Subsequently, based on a result of comparison between the angle ψ and an angle (β/2), the control signal output unit 112 determines whether all the groups fit within an image, that is, the recording pixel region 203.

When the control signal output unit 112 determines in step S123 that all the groups fit within the recording pixel region 203 by enlarging the angle of view of the imaging lens 11 to a predetermined angle of view, for example, to the wide-angle end through the zoom operation, the processing proceeds to step S124. In step S124, the control signal output unit 112 outputs the control signal for carrying out the zoom operation such that all the groups fit within an image, that is, the recording pixel region 203 to supply to the angle-of-view controller 113. A series of the processing using the flowchart in FIG. 17 is then terminated.

In this case, it is considered that the control signal output unit 112 generates a control signal for driving the imaging lens 11 to enlarge the angle of view thereof to a predetermined angle of view. The control signal output unit 112 is not limited to the operation above and may generate a control signal for controlling the angle of view of the imaging lens 11 based on the angle ψ obtained in step S123 described above using the formula (1).

When the control signal output unit 112 determines in step S123 that all the groups do not fit within the recording pixel region 203 even by enlarging the angle of view of the imaging lens 11 to the predetermined angle of view through the zoom operation, the processing proceeds to step S125. In step S125, the control signal output unit 112 outputs the control signal for carrying out the zoom operation in the imaging lens 11 to a predetermined angle of view, for example, to the wide-angle end and for carrying out the pan operation in the camera 1 group by group, to supply to the angle-of-view controller 113 and the direction controller 115.

Figure 18:
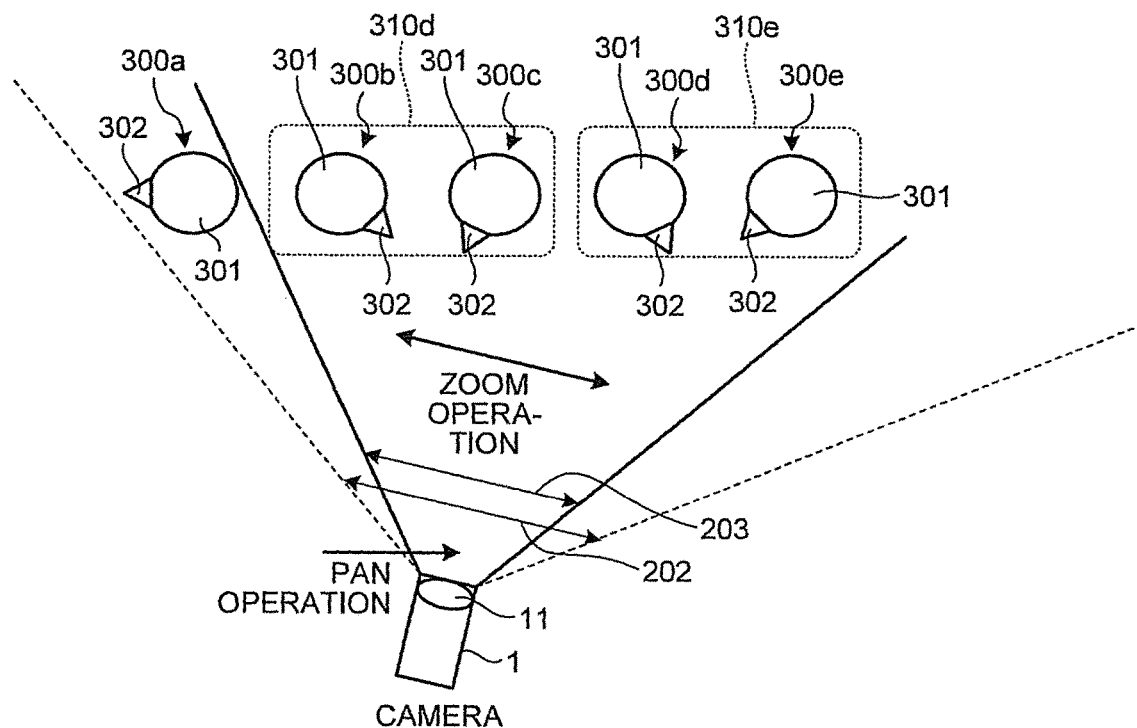
FIG. 18 is a diagram for explaining the imaging operation with attention focused on the group according to the first embodiment.

The operation in step S125 will be described with reference to FIGS. 18 and 19. FIG. 18 illustrates an example where two groups, namely, a group 310d and a group 310e are formed relatively close to each other within the effective pixel region 202. In the example in FIG. 18, the camera 1 can cause the imaging lens 11 to carry out the zoom operation to the wide-angle end or the like and to carry out the pan operation toward the center of gravity for the groups 310d and 310e to include the groups 310d and 310e within the recording pixel region 203.

In this case, the control signal output unit 112 generates a control signal for carrying out the zoom operation to the wide-angle end or the like to supply to the angle-of-view controller 113. At the same time, the control signal output unit 112 generates a control signal for carrying out the pan operation toward the center of gravity for the groups 310d and 310e to supply to the direction controller 115.

Figure 19:
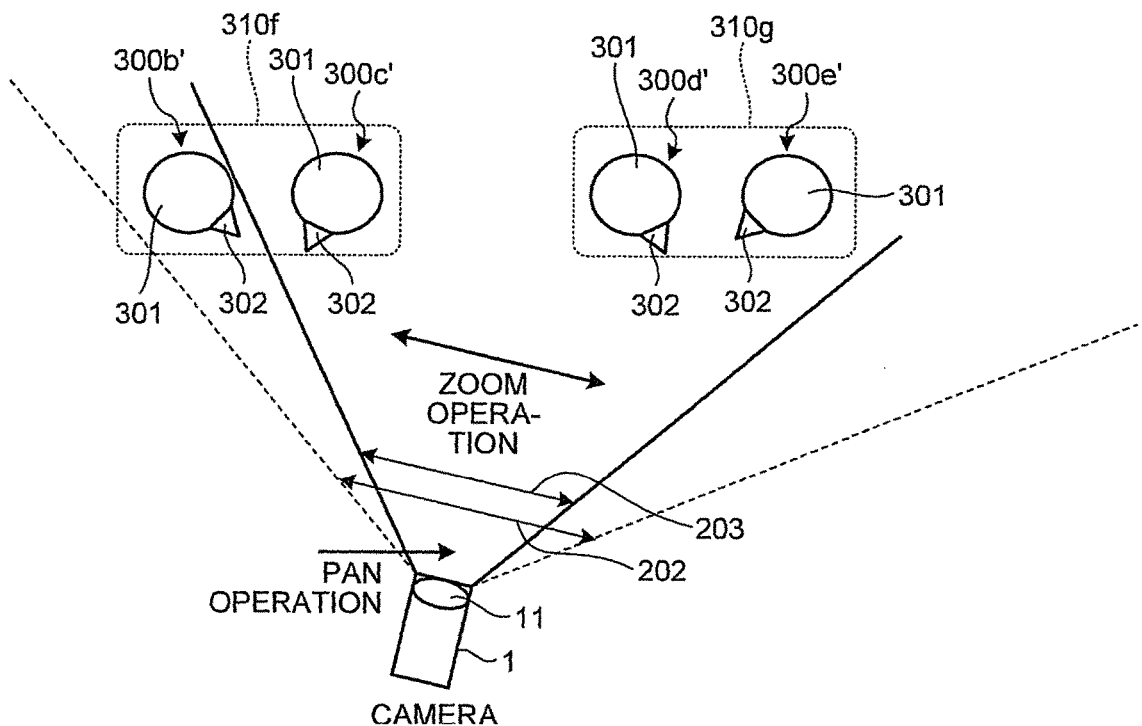
FIG. 19 is a diagram for explaining the imaging operation with attention focused on the group according to the first embodiment.

On the other hand, FIG. 19 illustrates an example where two groups, namely, a group 310f and a group 310g are formed relatively away from each other within the effective pixel region 202. In the example in FIG. 19, even when the camera 1 causes the imaging lens 11 to carry out the zoom operation to the wide-angle end or the like and to carry out the pan operation toward the center of gravity for the groups 310f and 310g, part of the groups 310f and 310g is located out of the recording pixel region 203. In this case, the camera 1 causes the imaging lens 11 to carry out the zoom operation to the wide-angle end or the like, and to first carry out the pan operation toward the center of gravity for the group 310f, for example. Next, the camera 1 keeps the imaging lens 11 carrying out the zoom operation to the wide-angle end or the like and causes the imaging lens 11 to carry out the pan operation toward the center of gravity for the group 310g. As a result, the groups 310f and 310g can be sequentially included within the recording pixel region 203.

In this case, the control signal output unit 112 first generates a control signal for carrying out the zoom operation to the wide-angle end or the like to supply to the angle-of-view controller 113. At the same time, the control signal output unit 112 generates a control signal for carrying out the pan operation toward the center of gravity for the group 310f to supply to the direction controller 115. After a predetermined period of time subsequent to that pan operation, the control signal output unit 112 generates a control signal for carrying out the pan operation toward the center of gravity for the group 310g to supply to the direction controller 115. Thereafter, a series of the processing using the flowchart in FIG. 17 is terminated.

When the control signal output unit 112 determines in step S122 described above that the operation mode of the camera 1 is the individual mode, the processing proceeds to step S126. In step S126, the control signal output unit 112 generates a control signal for carrying out the pan operation in the camera 1 group by group and for carrying out the zoom operation in the imaging lens 11 to the telephoto end side group by group, to supply to the direction controller 115 and the angle-of-view controller 113.

Figure 20:
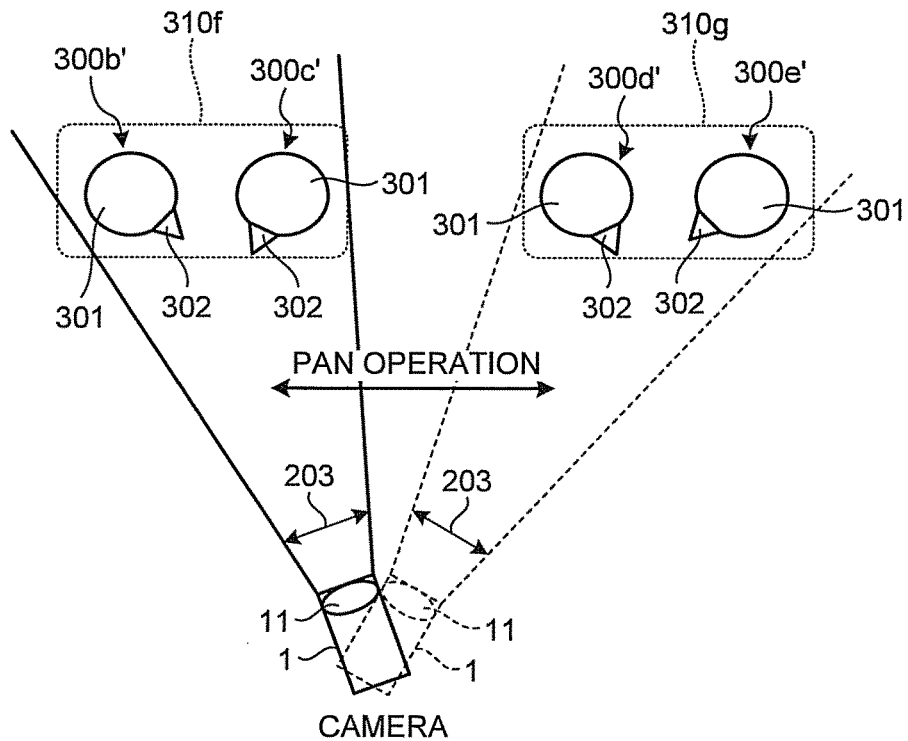
FIG. 20 is a diagram for explaining the imaging operation with attention focused on the group according to the first embodiment.

FIG. 20 illustrates an example where the pan operation and the zoom operation are carried out group by group in step S126 described above. In FIG. 20, the group 310f is formed by faces 300b' and 300c', while the group 310g is formed by faces 300d' and 300e' on the right side of the group 310f.

In the case of the pan operation which is sequentially carried out starting from a group on the left side, the control signal output unit 112 first obtains the direction of the center of gravity for the group 310f while obtaining respective positions of the faces 300b' and 300c' included in the group 310f on the imaginary imaging plane 51 (positions on the effective pixel region 202). Thereafter, the control signal output unit 112 calculates an angle of view $\gamma_1$ with which the obtained respective positions are located at, for example, both ends of the recording pixel region 203 (practically, respective positions considering contours of the respective faces 300b' and 300c'). In this case, the angle of view $\gamma_1$ can be calculated using the aforementioned formula (1) based on, for example, the current angle of view $\alpha$, the current positions of the faces 300b' and 300c' on the imaging plane 51, and the positions of the faces 300b' and 300c' on the imaging plane 51 after the zoom operation toward the telephoto end.

The control signal output unit 112 generates a control signal for carrying out the pan operation in the direction of the center of gravity for the group 310f to supply to the direction controller 115. At the same time, the control signal output unit 112 generates a control signal for changing the angle of view of the imaging lens 11 to the calculated angle of view $\gamma_1$ to supply to the angle-of-view controller 113.

After a predetermined period of time subsequent to the pan operation and the zoom operation carried out by the direction controller 115 and the angle-of-view controller 113, respectively, based on the control signal, in a similar manner to that described above, the control signal output unit 112 obtains the direction of the center of gravity for the group 310g and calculates an angle of view $\gamma_2$ to carry out the zoom operation for the faces 300d' and 300e'. The control signal output unit 112 then generates a control signal for carrying out the pan operation in the direction of the center of gravity for the group 310g to supply to the direction controller 115, and generates a control signal for changing the angle of view of the imaging lens 11 to the calculated angle of view $\gamma_2$ to supply to the angle-of-view controller 113.

In step S126, after the pan operation and the zoom operation are carried out for all groups included in the effective pixel region 202, a series of the processing using the flowchart in FIG. 17 is terminated. The camera 1 is not limited to the operation above and may repeat the pan operation and the zoom operation for the respective groups included in the effective pixel region 202.

Here, a situation where one face, for example, among the faces included in the effective pixel region 202 changes the direction thereof for an extremely short period of time is considered. In the case of the processing using the flowchart in FIG. 13 described above which is repeatedly carried out at a predetermined interval such as a frame period, there is a risk in which the change in the direction of the face for a short period of time is detected and a group configuration is altered every time the change in the direction is detected. With the group configuration which is altered every time the change in the direction is detected, there is a possibility that the camera 1 carries out the pan operation and the zoom operation based on the flowchart in FIG. 17 every time the change in the direction is detected, resulting in an unstable display or the like in the output image 121.

This phenomenon can be suppressed by applying low-pass filter processing at an execution timing of the operation in each of step S124, step S125, and step S126 in FIG. 17. In other words, the low-pass filter processing can suppress a response of each operation with respect to the change in the direction of the face for a short period of time to achieve a stable display.

As described thus far, according to the first embodiment, the respective faces included in the captured image 120 can be properly grouped. Furthermore, the pan operation and the zoom operation can be carried out in accordance with a result of grouping of the respective faces, which makes it possible to pay attention to faces relating to each other in the captured image 120 including a plurality of faces.

Second Embodiment

Next, a second embodiment will be described. In the aforementioned first embodiment, the direction of the face has been sequentially determined from the left end or the right end in the effective pixel region 202 during the group formation. Compared to this, in the second embodiment, a group including a face specified as a target among faces included in an effective pixel region 202 is formed.

Figure 21:
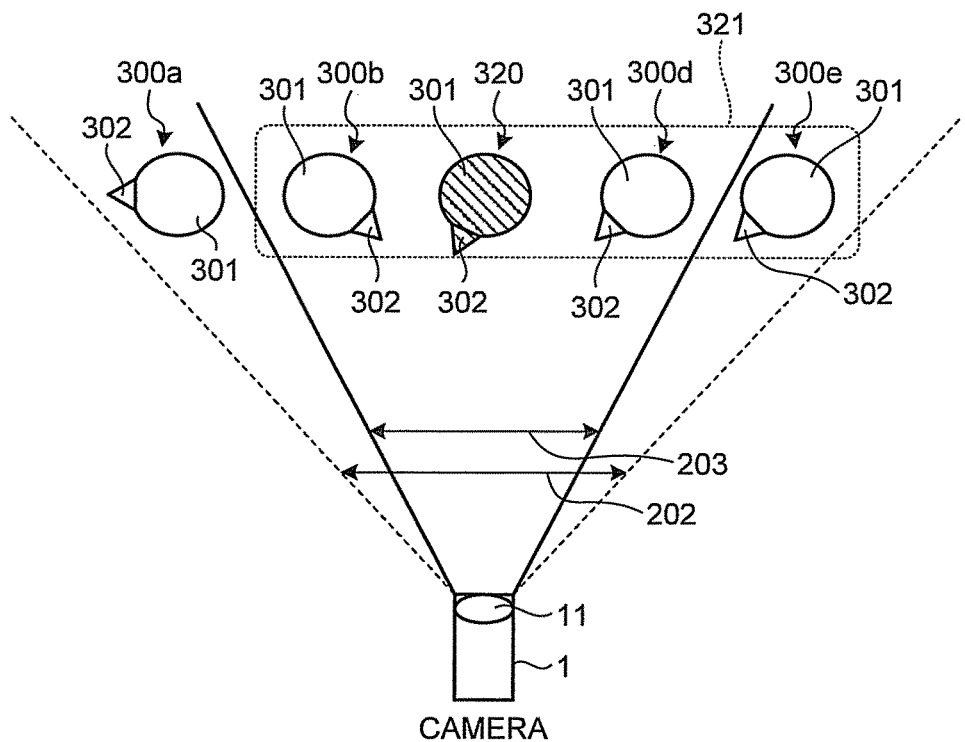
FIG. 21 is a diagram for explaining a group formation according to a second embodiment.

The group formation according to the second embodiment will be described with reference to FIG. 21. In FIG. 21, a face 320 is specified as the target for the group formation among faces 300a, 300b, 320, 300d, and 300e included in the effective pixel region 202. Hereinafter, the face 320 is referred to as target 320.

In the second embodiment, a group 321 (referred to as target belonging group 321) including the target 320 and the faces looking to the target 320, among the faces included in the effective pixel region 202, is formed. At this time, the target 320 may look in any of the following directions, that is, to the left, diagonally to the left, to the front, diagonally to the right, or to the right.

In the example in FIG. 21, the target 320 is located at the center of the faces included in the effective pixel region 202. In this situation, the face 300a located on the left side of the target 320 looks to the left, that is, does not look to the target 320. Accordingly, the face 300a is not included in the target belonging group 321. Meanwhile, the face 300b located on the left side of the target 320 looks to the right, that is, looks to the target 320. Accordingly, the face 300b is included in the target belonging group 321. In addition, the faces 300d and 300e located on the right side of the target 320 both look to the left, that is, look to the target 320. Accordingly, the faces 300d and 300e are included in the target belonging group 321.

Note that the zoom operation and the pan operation for the target belonging group 321 are the same as those in the first embodiment described above and thus the description thereof will be omitted here.

An example of group detection processing by a group detection unit 111 according to the second embodiment will be described with reference to flowcharts in FIGS. 22 to 25. Note that, in FIGS. 22 to 25, the signs "A", "B", and "C" indicate that the processing proceeds to the corresponding signs. Additionally, the target 320 is hereinafter assumed to always belong to a certain group. In other words, a group to which the target 320 alone belongs can be formed.

Prior to the processing using the flowcharts in FIGS. 22 to 25 described later, one face among the faces within the effective pixel region 202 is specified as the target 320 for the group detection unit 111. For example, it is considered that the target 320 is specified through operation of a user on an operation unit (not illustrated) provided in a camera 1. The processing using the flowcharts in FIGS. 22 to 25 is repeatedly carried out at a predetermined interval, for example, at an interval of a frame period of a captured image 120.

Figure 22:
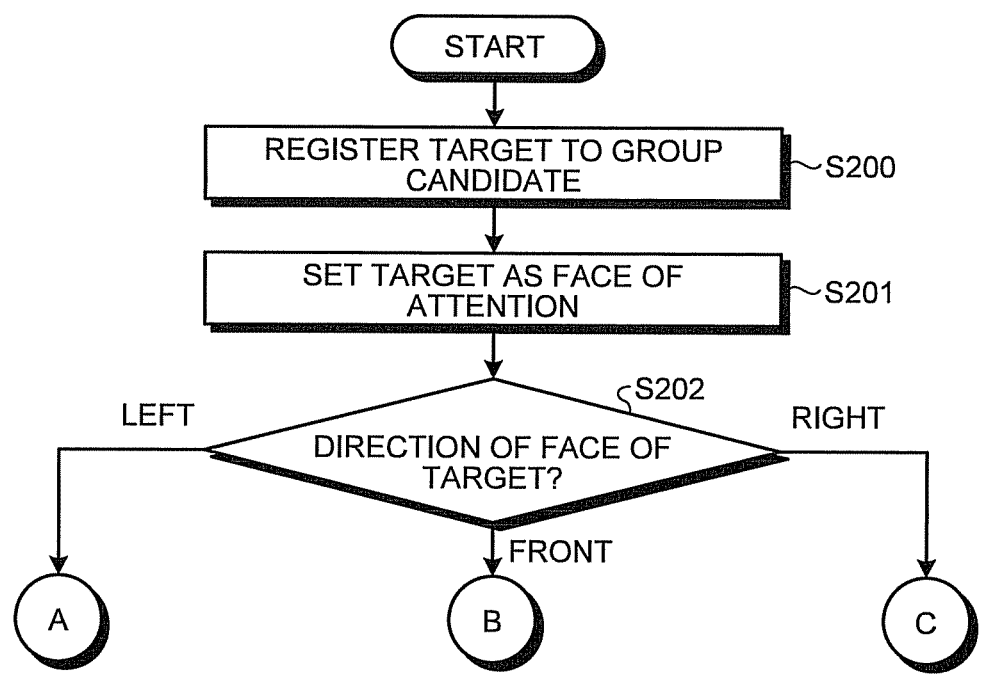
FIG. 22 is a flowchart illustrating an example of group detection processing according to the second embodiment.

In FIG. 22, the group detection unit 111 first registers the face of the target 320 to a group candidate in step S200. Subsequently in step S201, the group detection unit 111 sets the face of the target 320 as a face of attention. Subsequently in step S202, the group detection unit 111 then determines whether the direction of the face of the target 320 is left, front, or right. When the group detection unit 111 determines in step S202 that the direction of the face of the target 320 is front, the processing proceeds to the processing using the flowchart in FIG. 23 based on the sign "B".

Figure 23:
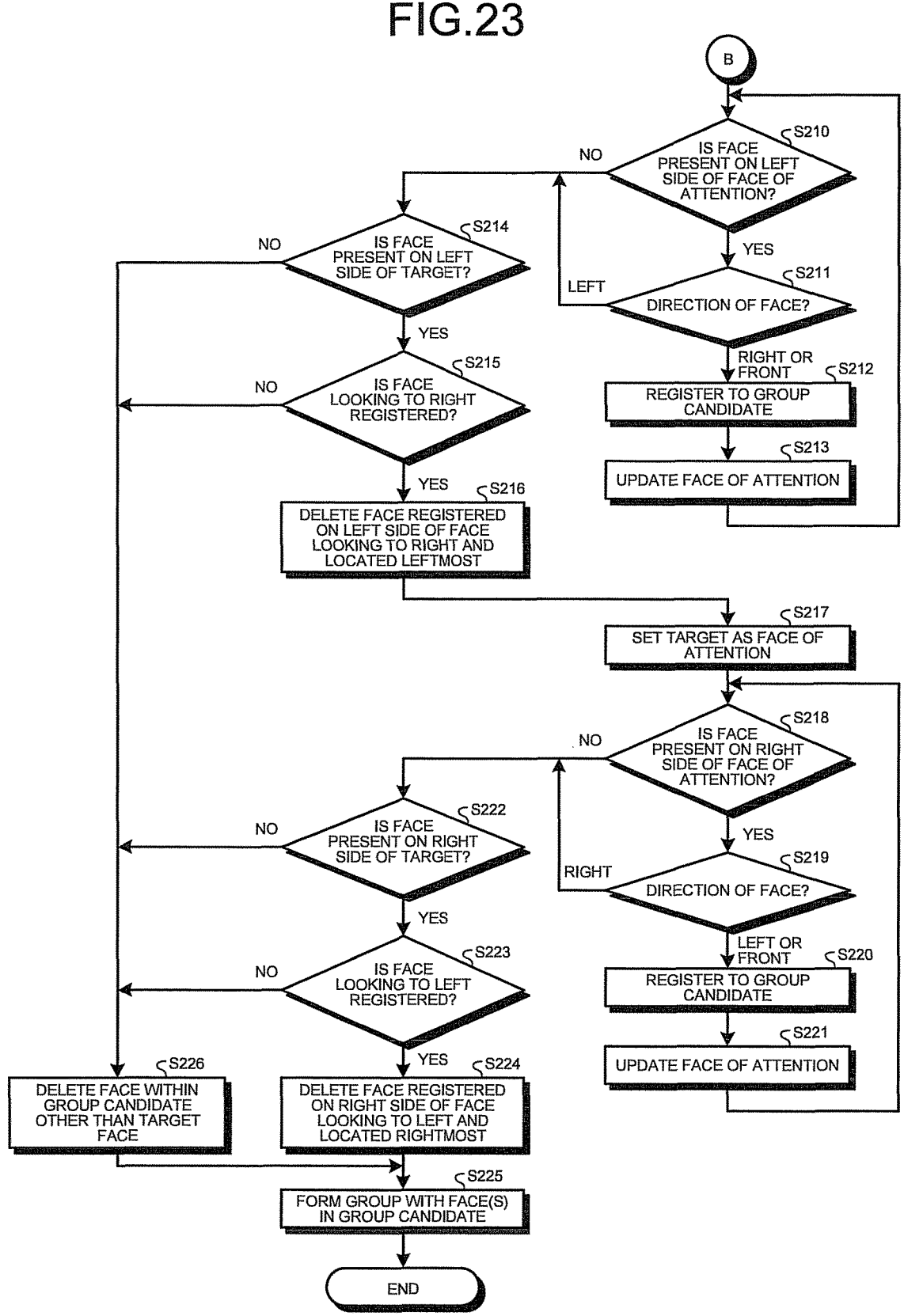
FIG. 23 is a flowchart illustrating an example of the group detection processing in a case where a face of a target looks to the front according to the second embodiment.

After the processing proceeds to the flowchart in FIG. 23, the group detection unit 111 determines in step S210 whether any face is present on the left side of the face of attention. When a face is determined to be present, the processing proceeds to step S211 and the group detection unit 111 determines the direction of the face being present on the left side of the face of attention. When the face being present on the left side of the face of attention is determined to look to the right or the front, the processing proceeds to step S212 and the group detection unit 111 registers, to the group candidate, the face being present on the left side of the face of attention. Subsequently in step S213, the group detection unit 111 updates the face of attention such that the face being present on the left side of the face of attention is set as a new face of attention. Thereafter, the processing returns to step S210.

Meanwhile, when the group detection unit 111 determines in step S210 described above that no face is present on the left side of the face of attention, or determines in step S211 described above that the face being present on the left side of the face of attention looks to the left, the processing proceeds to step S214. In step S214, the group detection unit 111 determines whether any face is present on the left side of the face of the target 320. When the group detection unit 111 determines that a face is present on the left side of the face of the target 320, the processing proceeds to step S215. In step S215, the group detection unit 111 determines whether the face looking to the right is registered in the group candidate. When the group detection unit 111 determines that the face looking to the right is registered, the processing proceeds to step S216.

Meanwhile, when the group detection unit 111 determines in step S214 that no face is present on the left side of the face of the target 320, or determines in step S215 that the face looking to the right is not registered in the group candidate, the processing proceeds to step S226.

In step S226, the group detection unit 111 deletes the faces registered in the group candidate other than the face of the target 320. As a result, the face of the target 320 alone is registered in the group candidate. When the group detection unit 111 completes the processing in step S226, the processing proceeds to step S225 described later.

In step S216, the group detection unit 111 deletes a face registered on the left side of the face looking to the right and being located leftmost, among the faces registered in the group candidate. As a result, among the faces registered in the group candidate, a face looking to the front is deleted from the left end side and the face looking to the right is registered at the left end of the group candidate.

Thereafter, the processing proceeds to step S217 and the group detection unit 111 sets the face of the target 320 as the face of attention again. Subsequently in step S218, the group detection unit 111 determines whether any face is present on the right side of the face of attention. When a face is determined to be present, the processing proceeds to step S219 and the group detection unit 111 determines the direction of the face being present on the right side of the face of attention. When the face being present on the right side of the face of attention is determined to look to the left or the front, the processing proceeds to step S220 and the group detection unit 111 registers, to the group candidate, the face being present on the right side of the face of attention. Subsequently in step S221, the group detection unit 111 updates the face of attention such that the face being present on the right side of the face of attention is set as a new face of attention. Thereafter, the processing returns to step S218.

Meanwhile, when the group detection unit 111 determines in step S218 described above that no face is present on the right side of the face of attention, or determines in step S219 described above that the face being present on the right side of the face of attention looks to the right, the processing proceeds to step S222. In step S222, the group detection unit 111 determines whether any face is present on the right side of the face of the target 320. When the group detection unit 111 determines that a face is present on the right side of the face of the target 320, the processing proceeds to step S223. In step S223, the group detection unit 111 determines whether a face looking to the left is registered in the group candidate. When the group detection unit ill determines that a face looking to the left is registered, the processing proceeds to step S224.

Meanwhile, when the group detection unit 111 determines in step S222 that no face is present on the right side of the face of the target 320, or determines in step S223 that the face looking to the left is not registered on the right side of the target in the group candidate, the processing proceeds to step S226. In step S226, the group detection unit 111 deletes the faces registered in the group candidate other than the face of the target 320.

In step S224, the group detection unit 111 deletes a face registered on the right side of the face looking to the left and being located rightmost, among the faces registered in the group candidate. As a result, among the faces registered in the group candidate, a face looking to the front is deleted from the right end side and the face looking to the left is registered at the right end of the group candidate.

Subsequently in step S225, the group detection unit 111 forms a group with the faces registered in the group candidate. A series of the processing in FIG. 23 in the case of the target 320 looking to the front is then terminated.

Figure 24:
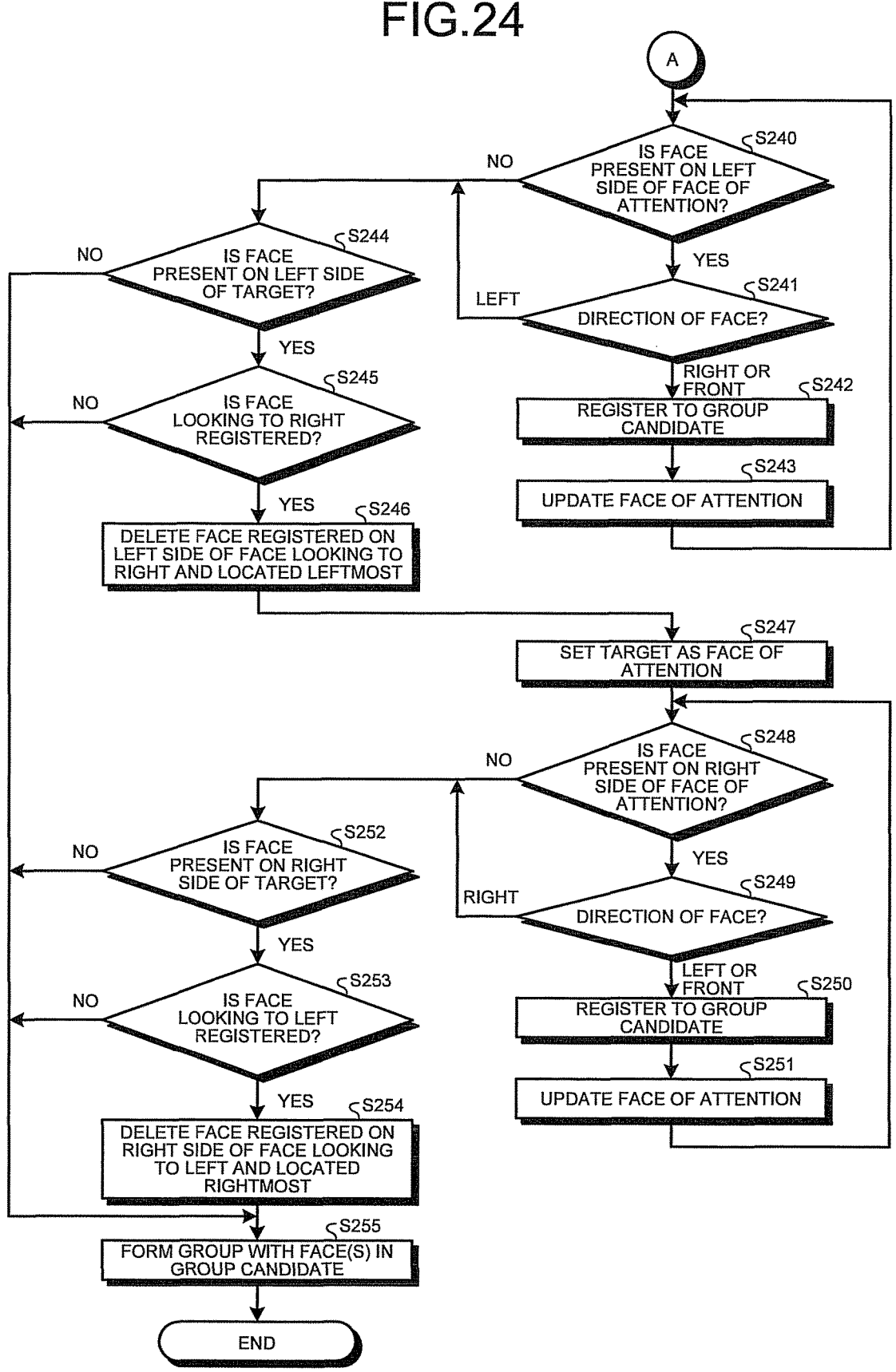
FIG. 24 is a flowchart illustrating an example of the group detection processing in a case where the face of the target looks to the left according to the second embodiment.

When the group detection unit 111 determines in step S202 in the aforementioned flowchart in FIG. 22 that the direction of the face of the target 320 is left, the processing proceeds to the processing using the flowchart in FIG. 24 based on the sign "A".

The processing using the flowchart in FIG. 24 functions as processing in which the processing in step S226 is removed from the aforementioned processing using the flowchart in FIG. 23. Specifically, the group detection unit 111 determines in step S240 whether any face is present on the left side of the face of attention. When a face is determined to be present, the group detection unit 111 subsequently determines in step S241 the direction of the face being present on the left side of the face of attention. When the face being present on the left side of the face of attention is determined to look to the right or the front, the processing proceeds to step S242 and the group detection unit 111 registers, to the group candidate, the face being present on the left side of the face of attention. Subsequently in step S243, the group detection unit 111 updates the face of attention such that the face being present on the left side of the face of attention is set as a new face of attention. Thereafter, the processing returns to step S240.

Meanwhile, when the group detection unit 111 determines in step S240 described above that no face is present on the left side of the face of attention, or determines in step S241 described above that the face being present on the left side of the face of attention looks to the left, the processing proceeds to step S244. The group detection unit 111 then determines whether any face is present on the left side of the face of the target 320. When a face is determined to be present, the processing proceeds to step S245 and the group detection unit 111 determines whether a face looking to the right is registered in the group candidate. When the group detection unit 111 determines that a face looking to the right is registered, the processing proceeds to step S246. In step S246, the group detection unit 111 deletes a face registered on the left side of the face looking to the right and being located leftmost, among the faces registered in the group candidate.

Meanwhile, when the group detection unit 111 determines in step S244 that no face is present on the left side of the face of the target 320, or determines in step S245 that the face looking to the right is not registered in the group candidate, the processing proceeds to step S255 described later.

After the processing in step S246, the processing proceeds to step S247 and the group detection unit 111 sets the face of the target 320 as the face of attention again. Subsequently in step S248, the group detection unit 111 determines whether any face is present on the right side of the face of attention. When a face is determined to be present, the processing proceeds to subsequent step S249 and the group detection unit 111 determines the direction of the face being present on the right side of the face of attention. When the face being present on the right side of the face of attention is determined to look to the left or the front, the processing proceeds to step S250 and the group detection unit 111 registers, to the group candidate, the face being present on the right side of the face of attention. Subsequently in step S251, the group detection unit 111 updates the face of attention such that the face being present on the right side of the face of attention is set as a new face of attention. Thereafter, the processing returns to step S248.

Meanwhile, when the group detection unit 111 determines in step S248 described above that no face is present on the right side of the face of attention, or determines in step S249 described above that the face being present on the right side of the face of attention looks to the right, the processing proceeds to step S252. In step S252, the group detection unit 111 determines whether any face is present on the right side of the face of the target 320. When a face is determined to be present, the processing proceeds to step S253. In step S253, the group detection unit 111 determines whether a face looking to the left is registered in the group candidate. When the group detection unit 111 determines that a face looking to the left is registered, the processing proceeds to step S254. In step S254, the group detection unit 111 deletes a face registered on the right side of the face looking to the left and being located rightmost, among the faces registered in the group candidate.

Subsequently in step S255, the group detection unit 111 forms a group with the faces registered in the group candidate. A series of the processing in FIG. 24 in the case of the target 320 looking to the left is then terminated.

Figure 25:
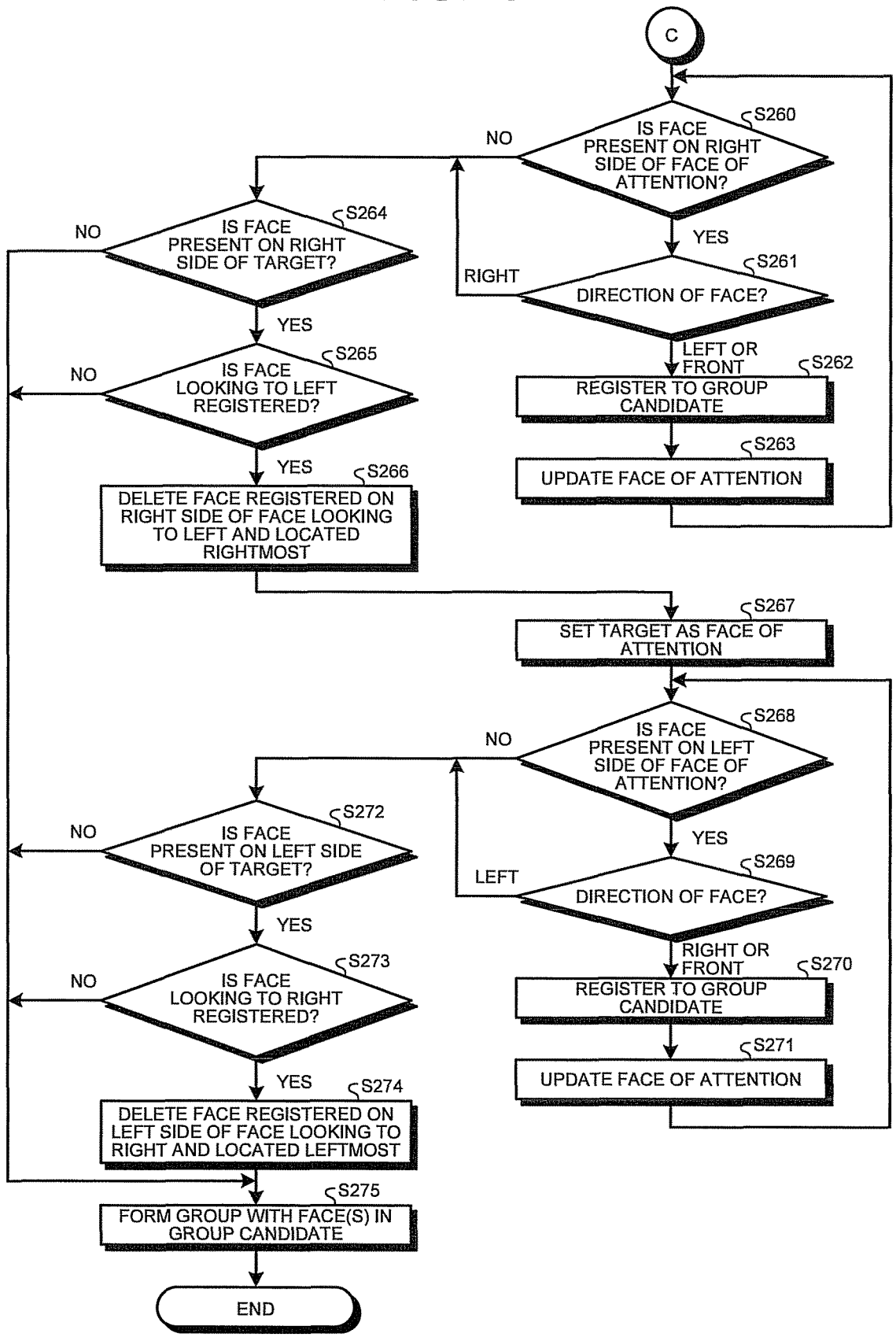
FIG. 25 is a flowchart illustrating an example of the group detection processing in a case where the face of the target looks to the right according to the second embodiment.

When the group detection unit 111 determines in step S202 in the aforementioned flowchart in FIG. 22 that the direction of the face of the target 320 is right, the processing proceeds to the processing using the flowchart in FIG. 25 based on the sign "C".

The processing using the flowchart in FIG. 25 functions as processing in which the descriptions of the right and the left are interchanged in the aforementioned processing in the flowchart in FIG. 24. Specifically, the group detection unit 111 determines in step S260 whether any face is present on the right side of the face of attention. When a face is determined to be present, the group detection unit 111 subsequently determines in step S261 the direction of the face being present on the right side of the face of attention. When the face being present on the right side of the face of attention is determined to look to the left or the front, the processing proceeds to step S262 and the group detection unit 111 registers, to the group candidate, the face being present on the right side of the face of attention. Subsequently in step S263, the group detection unit 111 updates the face of attention such that the face being present on the right side of the face of attention is set as a new face of attention. Thereafter, the processing returns to step S260.

Meanwhile, when the group detection unit 111 determines in step S260 described above that no face is present on the right side of the face of attention, or determines in step S261 described above that the face being present on the right side of the face of attention looks to the right, the processing proceeds to step S264. The group detection unit 111 then determines whether any face is present on the right side of the face of the target 320. When a face is determined to be present, the processing proceeds to step S265 and the group detection unit 111 determines whether a face looking to the left is registered in the group candidate. When the group detection unit 111 determines that a face looking to the left is registered, the processing proceeds to step S266. In step S266, the group detection unit 111 deletes a face registered on the right side of the face looking to the left and being located rightmost, among the faces registered in the group candidate.

Meanwhile, when the group detection unit 111 determines in step S264 that no face is present on the right side of the face of the target 320, or determines in step S265 that the face looking to the left is not registered in the group candidate, the processing proceeds to step S275 described later.

After the processing in step S266, the processing proceeds to step S267 and the group detection unit 111 sets the face of the target 320 as the face of attention again. Subsequently in step S268, the group detection unit 111 determines whether any face is present on the left side of the face of attention. When a face is determined to be present, the processing proceeds to subsequent step S269 and the group detection unit 111 determines the direction of the face being present on the left side of the face of attention. When the face being present on the left side of the face of attention is determined to look to the right or the front, the processing proceeds to step S270 and the group detection unit 111 registers, to the group candidate, the face being present on the left side of the face of attention. Subsequently in step S271, the group detection unit 111 updates the face of attention such that the face being present on the left side of the face of attention is set as a new face of attention. Thereafter, the processing returns to step S268.

Meanwhile, when the group detection unit 111 determines in step S268 described above that no face is present on the left side of the face of attention, or determines in step S269 described above that the face being present on the left side of the face of attention looks to the left, the processing proceeds to step S272. In step S272, the group detection unit 111 determines whether any face is present on the left side of the face of the target 320. When a face is determined to be present, the processing proceeds to step S273. In step S273, the group detection unit 111 determines whether a face looking to the right is registered in the group candidate. When the group detection unit 111 determines that a face looking to the right is registered, the processing proceeds to step S274. In step S274, the group detection unit 111 deletes a face registered on the left side of the face looking to the right and being located leftmost, among the faces registered in the group candidate.

Subsequently in step S275, the group detection unit 111 forms a group with the faces registered in the group candidate. A series of the processing in FIG. 25 in the case of the target 320 looking to the right is then terminated.

Figure 26:
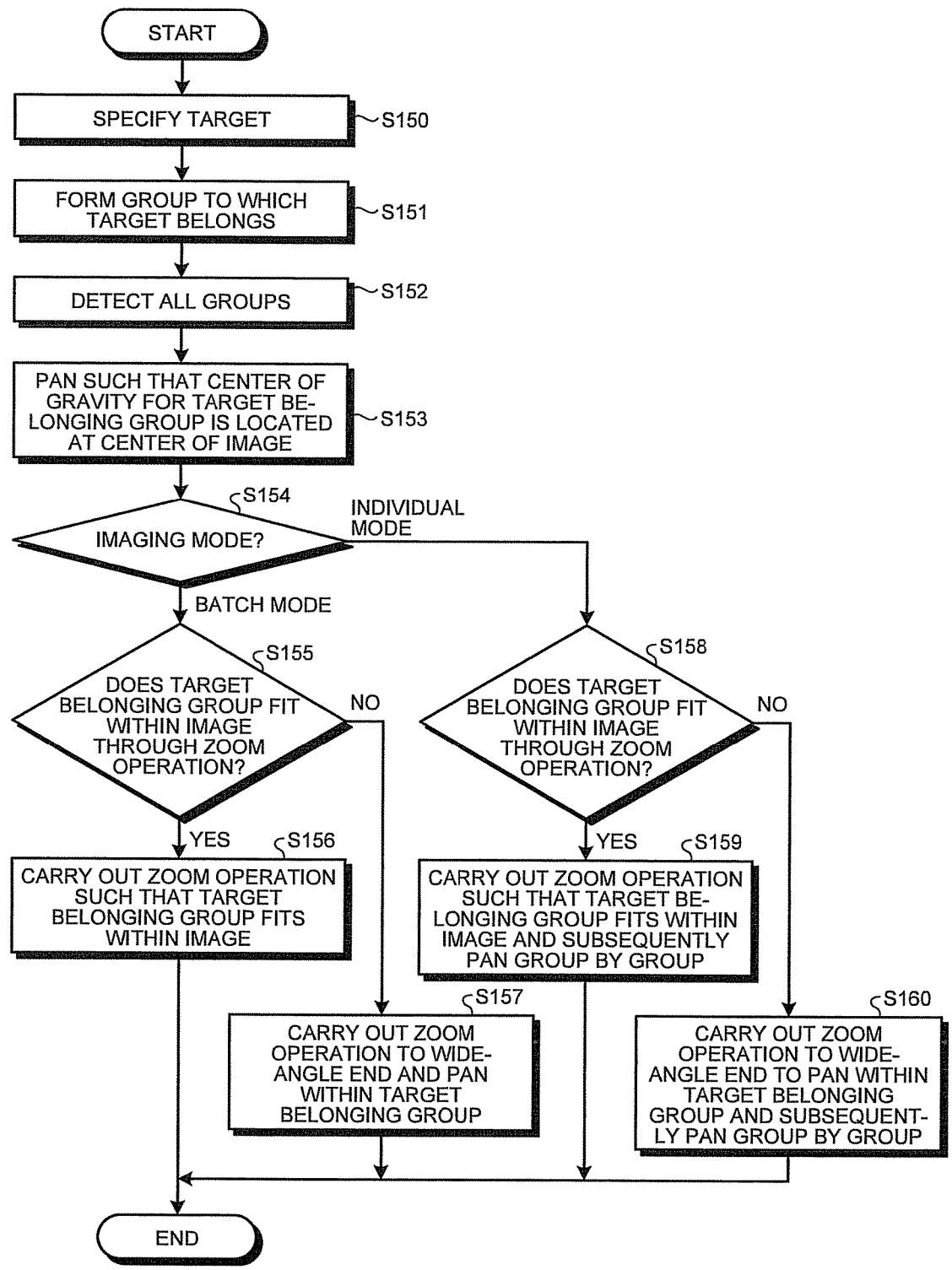
FIG. 26 is a flowchart illustrating an example of the imaging operation with attention focused on the group including the face of the target according to the second embodiment.

FIG. 26 is a flowchart illustrating an example of the imaging operation with attention focused on the group including the face of the target according to the second embodiment. In step S150 in FIG. 26, one face among the faces within the effective pixel region 202 is specified as a target for the group detection unit 111. Subsequently in step S151, the group detection unit 111 forms a target belonging group including the target based on the aforementioned processing using the flowchart in FIG. 22.

Subsequently in step S152, the group detection unit 111 detects all groups formed by the faces included in the effective pixel region 202 based on the aforementioned processing using the flowchart in FIG. 13. At this time, the group detection unit 111 forms a group with the respective faces included in the effective pixel region 202 other than the faces included in the target belonging group.

Subsequently in step S153, a control signal output unit 112 outputs the control signal for panning such that a center of gravity for the target belonging group detected in step S151 is located at the center of the output image 121, that is, a recording pixel region 203. Based on the control signal, a direction controller 115 controls the pan/tilt driving unit 116 to change the imaging direction of the camera 1.

Subsequently in step S154, the control signal output unit 112 determines whether an imaging mode of the camera 1 is a batch mode or an individual mode. When the control signal output unit 112 determines in step S154 that the operation mode of the camera 1 is the batch mode, the processing proceeds to step S155. In step S155, the control signal output unit 112 determines whether the target belonging group fits within an image, that is, the recording pixel region 203 through the zoom operation. The determination here can be carried out using the same procedure as that in the aforementioned processing in step S123 in the flowchart in FIG. 17.

When the control signal output unit 112 determines in step S155 that the target belonging group fits within the recording pixel region 203 through the zoom operation, the processing proceeds to step S156. In step S156, the control signal output unit 112 outputs the control signal for carrying out the zoom operation such that the target belonging group fits within an image, that is, the recording pixel region 203 to supply to an angle-of-view controller 113. A series of the processing using the flowchart in FIG. 26 is then terminated.

When the control signal output unit 112 determines in step S155 that the target belonging group does not fit within the recording pixel region 203 even through the zoom operation, the processing proceeds to step S157. In step S157, the control signal output unit 112 outputs the control signal for carrying out the zoom operation in the imaging lens 11 to the wide-angle end or the like and for carrying out the pan operation in the camera 1 within the target belonging group such that the target belonging group is imaged, to supply to the angle-of-view controller 113 and the direction controller 115. A series of the processing using the flowchart in FIG. 26 is then terminated.

As described in the flowcharts in FIGS. 22 to 25, there is a case where the face of the target 320 alone is present in the target belonging group. In this case, it is favorable for the camera 1 to carry out the zoom operation in step S157 such that the face of the target 320 is imaged in an appropriate size, instead of panning within the target belonging group.

When the control signal output unit 112 determines in step S154 that the operation mode of the camera 1 is the individual mode, the processing proceeds to step S158. In step S158, the control signal output unit 112 determines whether the target belonging group fits within an image, that is, the recording pixel region 203 through the zoom operation.

When the control signal output unit 112 determines in step S158 that the target belonging group fits within the recording pixel region 203 through the zoom operation, the processing proceeds to step S159. In step S159, the control signal output unit 112 outputs the control signal for carrying out the zoom operation in the imaging lens 11 such that the target belonging group fits within an image, that is, the recording pixel region 203 and for carrying out the pan operation in the camera 1 for each of all groups including the target belonging group, to supply to the angle-of-view controller 113 and the direction controller 115. A series of the processing using the flowchart in FIG. 26 is then terminated.

In this case, the camera 1 can image, in step S159, the target belonging group with different imaging operation from that for other groups to further highlight the target belonging group in the captured image 120. As examples of such imaging operation exclusively for the case where the target belonging group is imaged, it is considered that the target belonging group is imaged with different camera operation from that for other groups by outputting the control signal for imaging for a longer period of time than the case of other groups, capturing a close-up image by causing the imaging lens 11 to carry out the zoom operation further to the telephoto end side than the case of other groups, and imaging with slower pan operation than the case of other groups.

When the control signal output unit 112 determines in step S158 that the target belonging group does not fit within the recording pixel region 203 even through the zoom operation, the processing proceeds to step S160. In step S160, the control signal output unit 112 outputs the control signal for carrying out the zoom operation in the imaging lens 11 to the wide-angle end or the like and for carrying out the pan operation in the camera 1 within the target belonging group, to supply to the angle-of-view controller 113 and the direction controller 115. Additionally, once the pan operation within the target belonging group in the camera 1 is completed, the control signal output unit 112 outputs the control signal for carrying out the pan operation group by group to supply to the direction controller 115. A series of the processing using the flowchart in FIG. 26 is then terminated.

As described above, there is a case where the face of the target 320 alone is present in the target belonging group. In this case, it is favorable for the camera 1 to carry out the zoom operation in step S160 such that the face of the target 320 is imaged in an appropriate size, instead of panning within the target belonging group.

When carrying out the pan operation within the target belonging group in step S160, the camera 1 can image the face of the target with different imaging operation from that for other faces to further highlight the face of the target. As examples of such imaging operation exclusively for the case where the face of the target is imaged, it is considered that the face of the target is imaged with different camera operation from that for other faces by outputting the control signal for imaging for a longer period of time than the case of other faces, for capturing a close-up image by causing the imaging lens 11 to carry out the zoom operation further to the telephoto end side than the case of other faces, and for imaging with slower pan operation than the case of other faces.

The camera 1 can specify not only one face of the target but also the plurality of faces of the targets. In the case where the faces of the respective targets belong to a plurality of groups, the camera 1 may carry out the aforementioned imaging operation for highlighting the target belonging group with regard to the plurality of groups to which the faces of the respective targets belong. Additionally, in the case where a plurality of faces specified as targets belongs to one group, the camera 1 may carry out the aforementioned imaging operation for highlighting the face of the target with regard to each of the faces of the targets during the pan operation within the group.

As described thus far, according to the second embodiment, a group including the specified face of the target can be formed with the respective faces included in the captured image 120. Accordingly, the pan operation and the zoom operation can be selectively carried out for the group including the face of the target. As a result, the degree of attention for the group including the face of the target can be enhanced.

Third Embodiment

Next, a third embodiment will be described. In the aforementioned first and second embodiments, the description has been given by assuming that the respective faces included within the effective pixel region 202 are linearly arranged on a plane substantially perpendicular to the optical axis of the camera 1. The third embodiment describes an example of the group formation in a case where the faces included within an effective pixel region 202 are two-dimensionally arranged, that is, spread out in a planar shape on a plane substantially parallel to the optical axis of a camera 1 in the horizontal direction.

For example, in a place where there are many people, when the camera 1 is used to capture an overhead view image at a higher position than the position of the face of each person, the respective faces spread out in a planar shape in a depth direction to be arranged in a captured image 120. In this case, the respective faces are arranged in the vertical direction of the image depending on distances thereof from the camera 1.

Figure 27:
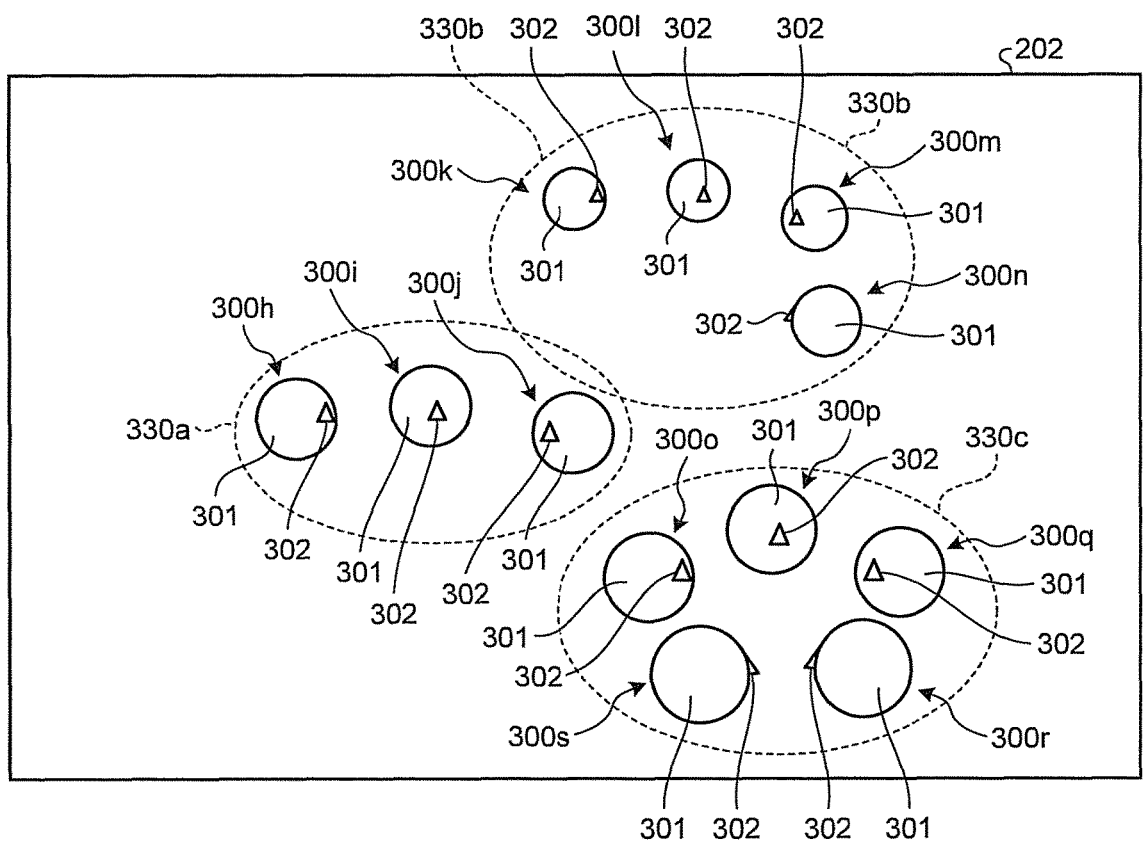
FIG. 27 is a diagram illustrating exemplary grouping according to a third embodiment.

In the case of the faces arranged two-dimensionally in the captured image 120, it is considered that the respective faces are grouped based on distances between the respective faces and sizes of the respective faces on the image. FIG. 27 illustrates exemplary grouping according to the third embodiment.

In FIG. 27, a face recognition unit 110 recognizes faces 300$h$ to 300$s$ within the effective pixel region 202 and outputs face position information indicating the positions of the respective faces 300$h$ to 300$s$ within the effective pixel region 202 and face direction information indicating the directions of the respective faces 300$h$ to 300$s$ to supply to a group detection unit 111. In addition, the face recognition unit 110 obtains sizes of the respective faces 300$h$ to 300$s$ on the image during recognition processing for the respective faces 300$h$ to 300$s$ within the effective pixel region 202. The face recognition unit 110 then supplies face size information indicating the obtained sizes of the respective faces 300$h$ to 300$s$ to the group detection unit 111.

Based on the face position information and the face size information supplied from the face recognition unit 110, the group detection unit 111 carries out the grouping of the respective faces 300$h$ to 300$s$ being present within the effective pixel region 202.

First, the group detection unit 111 obtains the distances between the respective faces 300$h$ to 300$s$ based on the face position information and forms a group from the faces in a shorter distance therebetween. For example, the group detection unit 111 obtains a distance to an adjacent face with regard to the respective faces 300$h$ to 300$s$. Thereafter, once the distance to an adjacent face is obtained with regard to the respective faces 300$h$ to 300$s$, the group detection unit 111 sets a threshold based on each of the obtained distances and obtains a distance to each of the other faces with regard to the respective faces 300$h$ to 300$s$. The group detection unit 111 then forms a group by sequentially extracting a face located in a distance within the threshold.

As described above, a group formed based on the sizes and the distances of the faces with regard to the respective faces 300$h$ to 300$s$ included within the effective pixel region 202 is referred to as a provisional group.

Referring to FIG. 27 as an example for the description, the group detection unit 111 individually obtains a distance from, for example, the face 300$h$ to each of the other faces 300$i$ to 300$s$ to extract a face located in a distance within the threshold. Here, the face 300$i$ is assumed to be a face located in a distance within the threshold to the face 300$h$. Next, the group detection unit 111 individually obtains a distance from the face 300$i$ to each of the other faces 300$j$ to 300$s$ other than the face 300$h$ to extract a face located in a distance within the threshold. Here, the face 300$j$ is assumed to be a face located in a distance within the threshold to the face 300$i$.

Subsequently, the group detection unit 111 individually obtains a distance from the face 300$j$ to each of the other faces 300$k$ to 300$s$ other than the faces 300$h$ and 300$i$ to extract a face located in a distance within the threshold. For example, in a case where no face located in a distance within the threshold can be extracted for the face 300$j$, the group detection unit 111 forms a provisional group 330$a$ from the faces 300$h$ to 300$j$ whose distances between one another are all within the threshold, and forms a provisional group 330$b$ for other faces based on the distances starting from the next face, for example, the face 300k. The group detection unit 111 forms a provisional group 330c in a similar manner.

The group detection unit 111 forms in a similar manner a provisional group based on the distances for the respective faces 300k to 300s within the effective pixel region 202. In the example in FIG. 27, it is assumed that the three provisional groups 330a to 330c have been formed within the effective pixel region 202.

Additionally, the group detection unit 111 can categorize the respective faces 300h to 300s into groups based on the face size information. For example, the group detection unit 111 obtains a distribution of the sizes of the respective faces 300h to 300s based on the face size information and categorizes faces having similar sizes into a group according to the obtained distribution.

Figure 28:
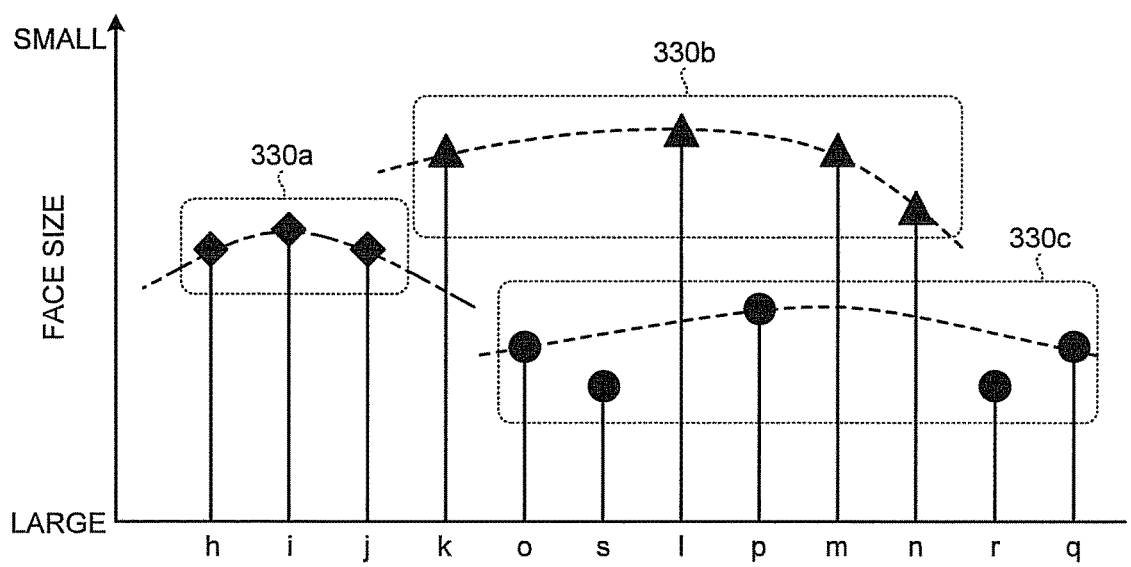
FIG. 28 is a diagram illustrating an exemplary distribution of face sizes associated with the positions of the respective faces.

Hereinafter, an example of a method for categorizing faces having similar sizes into a group will be described. It is clear from FIG. 27 that the multiple faces 300h to 300s are included within the effective pixel region 202 and, among the faces 300h to 300s, faces in a lower part of the effective pixel region 202, that is, closer to the camera 1 are larger in size and faces in an upper part of the effective pixel region 202, that is, farther from the camera 1 are smaller in size. FIG. 28 illustrates an exemplary distribution of the face sizes on a face arrangement in the example in FIG. 27, associated with the positions of the respective faces 300h to 300s. In FIG. 28, a vertical axis represents a face size on the effective pixel region 202, where faces become smaller in size in the direction of an arrow. In addition, a horizontal axis represents indexes h to s corresponding to the faces 300h to 300s, respectively, and an array of the respective faces 300h to 300s on the effective pixel region 202.

Typically, a plurality of people having conversation often forms a shape of group based on the positions of the faces obtained by a substantially circular arrangement or a substantially arc-shaped arrangement, as illustrated in FIG. 27. When an overhead view image of this group is captured with the camera 1, in the captured image 120, a face located on the front side of the group when viewed from the camera 1, that is, a backhead (with the back turned toward the camera 1) is the largest in size, faces on both ends of the group are the second largest in size, and a face located on the rear side of the group is the smallest in size.

Here, by ignoring the face appearing as the backhead, the distribution of the sizes, of the faces located on both ends and the rear side of the group are considered. In this case, in the group having a substantially circular shape or a substantially arc-like shape, the face located on the rear side of the group is smaller in size than the faces located on both ends of the group. As illustrated in FIG. 28 with dashed lines, the distribution of the face sizes is expressed by an arch with an upward convex shape for each of the groups 330a, 330b, and 330c. In other words, a possibility of a face located at the central part of the group being larger in size than the faces on both ends of the group is small. Based on this condition of the distribution of the face sizes in the group, the respective faces 300h to 300s can be categorized into groups.

At this time, when a face looking in a direction similar to that of the backhead is recognized among the group, the group categorization of that face performed by the group detection unit 111 is not limited to the method based on the condition of the arch-shaped distribution. In this case, the group detection unit 111 can categorize that face into, for example, a group right above that group, that is, a group having a face-to-face positional relationship with respect to that face in the captured image 120.

During formation of the provisional group described above, the group detection unit 111 can detect whether the size of that face is distributed on the arch with a convex upward shape, whereby the categorization accuracy of the provisional group is enhanced.

In a similar manner to the aforementioned first or second embodiment, the group detection unit 111 forms a group from the faces for each of the formed provisional groups 330a to 330c.

The group formation will be described with reference to the provisional group 330c exemplified in FIG. 27 as an example. As illustrated in FIG. 27, the provisional group 330c includes five faces, namely, the faces 300o to 300s. Among the faces 300o to 300s, the faces 300r and 300s look diagonally backward relative to the camera 1. Even in this case, the directions of the faces can be obtained as long as noses 302 are detected on the faces 300r and 300s.

In the third embodiment, as in the aforementioned first or second embodiment, the group detection unit 111 can form a group based on the direction of one face belonging to the provisional group. At this time, it is considered that the group detection unit 111 determines the direction of the face in an order depending on the positions of the respective faces in the horizontal direction in the effective pixel region 202. In the example in FIG. 27, the faces 300o, 300p, and 300s each look to the right, whereas the faces 300q and 300r each look to the left. For example, by using the method for forming the group according to the first embodiment, in which it is assumed that the group formation is started from, for example, the face 300o located at the left end in the provisional group 330c, a group is formed by five faces, namely, the faces 300o to 300s based on the flowchart in FIG. 13.

The group detection unit 111 is not limited to the method above and may form a group based on the center of gravity for the respective faces belonging to the provisional group. Specifically, the group detection unit 111 forms a group with faces looking in the direction of the center of gravity, among the faces belonging to the provisional group.

As described earlier, the control signal output unit 112 can carry out the pan operation and the zoom operation, for example, group by group for the groups formed in this manner according to the third embodiment.

The group detection unit 111 may exclude a face looking backward or looking diagonally backward, such as the faces 300r and 300s, from the determination for the group formation. This is because a backhead is merely imaged even through, for example, the pan operation and the zoom operation with attention focused on a person looking backward or looking diagonally backward and it is then considered that the priority thereof is low.

Variation of Third Embodiment

Next, a variation of the third embodiment will be described. The variation of the third embodiment employs an imaginary line connecting the respective faces in the case of the aforementioned third embodiment where the faces two-dimensionally spread out to be arranged on a plane substantially parallel to the optical axis of the camera 1 in the horizontal direction.

Figure 29:
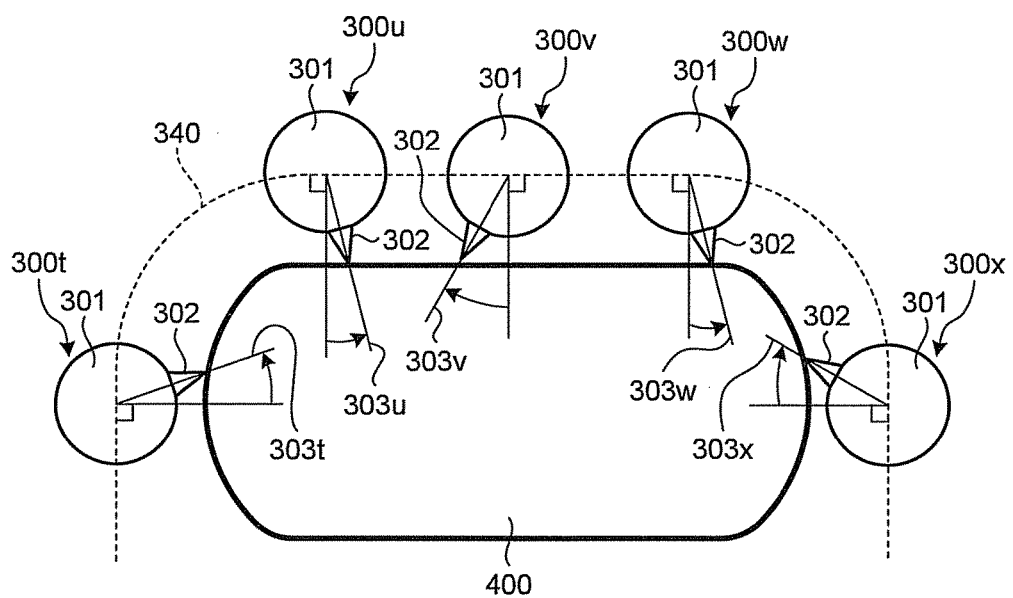
FIG. 29 is a diagram for explaining an imaginary line according to a variation of the third embodiment.

The imaginary line according to the variation of the third embodiment will be described with reference to FIG. 29. FIG. 29 illustrates an example of five faces, namely, faces 300t to 300x aligned around a table 400 when viewed from right above the table 400. At this time, an imaginary line 340 sequentially connecting the centers of the respective faces 300t to 300x is defined and the direction of each of the faces 300t to 300x is defined based on a normal line at the position of the face relative to the imaginary line 340. After the directions of the respective faces 300*t* to 300*x* are defined as described above, the aforementioned group detection processing according to the first or second embodiment is carried out.

The group detection processing according to the variation of the third embodiment will be described in more detail. First, a face recognition unit 110 recognizes the respective faces within an effective pixel region 202 and obtains face position information indicating a position of each of the recognized faces on the effective pixel region 202, face direction information indicating a direction of each face on the effective pixel region 202, and face size information indicating a size of each face on the image. At this time, the face recognition unit 110 obtains the direction of each face, including a face in a profile and a face looking diagonally backward. For example, based on positional relationships between the face region and the respective facial organs (e.g. an eye, a nose, and a mouth) of the face, the face recognition unit 110 obtains the direction of the face including a face in a profile and a face looking diagonally backward. The face recognition unit 110 supplies the obtained face position information, face direction information, and face size information on each face to a group detection unit 111.

As described in the third embodiment, the group detection unit 111 forms a provisional group based on the face position information and the face size information on each face supplied from the face recognition unit 110. Here, a provisional group is assumed to be formed by the faces 300*t* to 300*x* illustrated in FIG. 29.

Next, the group detection unit 111 uses the imaginary line 340 to connect the centers of the respective faces 300*t* to 300*x* belonging to the provisional group. At this time, the group detection unit 111 is assumed to ignore a face looking just backward relative to a camera 1, among the faces included in the provisional group. For example, by setting one face out of the faces 300*t* to 300*x* belonging to the provisional group, for example, the face 300*t* located at the end as a starting point, the group detection unit 111 connects the respective faces 300*u* to 300*x* included in the provisional group using the imaginary line 340 in a predetermined direction, for example, clockwise. The group detection unit 111 constructs the imaginary line 340 smoothly connecting the respective faces 300*t* to 300*x* using a Bezier curve or the like.

Next, with regard to the respective faces 300*t* to 300*x* connected with the imaginary line 340, the group detection unit 111 obtains the normal line of each of the faces 300*t* to 300*x* located on the imaginary line 340. More specifically, the group detection unit 111 first obtains a tangent line relative to the imaginary line 340 at a position of each of the faces 300*t* to 300*x* located on the imaginary line 340, and subsequently obtains a normal line relative to the tangent line as the normal line of each of the faces 300*t* to 300*x*. The group detection unit 111 then estimates the direction of the face relative to the normal line for the respective faces 300*t* to 300*x*.

In the example in FIG. 29, assuming that a direction of a clockwise rotation relative to the normal line is a left direction, whereas a direction of a counterclockwise rotation relative to the normal line is a right direction, the directions of the faces 300*t*, 300*u*, and 300*w*, among the faces 300*t* to 300*x*, are estimated to be right based on directions 303*t*, 303*u*, and 303*w*, respectively, relative to the respective normal lines. On the other hand, the directions of the faces 300*v* and 300*x* are estimated to be left based on directions 303*v* and 303*x*, respectively, relative to the respective normal lines.

In accordance with the directions of the respective faces 300*t* to 300*x* detected through the imaginary line 340 as described above, as in the aforementioned first or second embodiment, the group detection unit 111 can form a group based on the direction of one face belonging to the provisional group. For example, by using the method for forming the group according to the first embodiment, in which it is assumed that the group formation is started from, for example, the face 300*t* located at the left end on the imaginary line 340, the group detection unit 111 forms a first group with the faces 300*t*, 300*u*, and 300*v* and additionally a second group with the faces 300*w* and 300*x* based on the flowchart in FIG. 13.

As described earlier, the control signal output unit 112 can carry out the pan operation and the zoom operation, for example, group by group for the respective groups formed in this manner according to the variation of the third embodiment.

In the variation of the third embodiment, there is a case where the group detection unit 111 cannot accurately determine the direction of each face because the imaginary line 340 in a three-dimensional space is arranged on a two-dimensional planar imaging plane. Therefore, it is considered that the group detection unit 111 corrects the direction of each face, for example, based on an angle between the direction of the optical axis of the camera 1 and a plane in which the imaginary line 340 is constructed in the three-dimensional space.

As described thus far, according to the third embodiment and the variation of the third embodiment, a group can be properly formed even with the respective faces arranged two-dimensionally.

The present invention achieves an effect that makes it possible to properly form a group constituted by persons included in a captured image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device, comprising:
   an imaging unit configured to image an object and output a captured image
   a memory that is configured to store computer executable instructions; and
   a processor that is configured to execute the computer executable instructions to perform operations, comprising:
   imaging an object and outputting a captured image;
   recognizing a face included in the captured image and detecting a direction and a position of the recognized face;
   detecting a group formed by the faces included in the captured image based on directions and positions of two faces being adjacent to each other among the faces included in the captured image;
   outputting a control signal indicating a direction of the group;
   controlling an angle of view for imaging; and
   controlling an imaging direction of the imaging unit based on the control signal such that the face included in the group is included in the captured image, wherein controlling the angle of view based on the control signal such that the face included in the group is included in the captured image, and controlling the imaging direction based on the control signal to switch among the plurality of the groups one by one in a case where the detecting detects the plurality of the groups in the captured image.

2. The imaging device according to claim 1, wherein the detecting further comprises:

first face detection processing that detects a first face being located at one end of the captured image and looking in a first direction which is a central direction of the captured image when viewed from the one end;

second face detection processing that detects a second face being adjacent to the first face in the first direction;

third face detection processing that detects a third face being adjacent to the second face in the first direction; and group detection processing that detects a group including the respective faces detected through the first face detection processing and the second face detection processing in a case where the third face looks in the first direction and the second face looks in a second direction which is a direction from the central direction toward the one end in the captured image, and in a case where the third face is not detected and the second face looks in the second direction, the group detection processing detecting a second face through the second face detection processing by setting the third face as a new first face in a case where the third face and the second face look in the first direction, and the group detection processing detecting a second face through the second face detection processing by setting the third face as a new first face in a case where the third face looks in the second direction.

3. The imaging device according to claim 1, wherein the angle-of-view controller controls the angle of view based on the control signal such that the faces included in a plurality of groups detected are included in the captured image in a case where the the plurality of the groups are detected in the captured image.

4. The imaging device according to claim 1, wherein the operations further comprise:

detecting the group including at least a specified face out of the specified face and a face looking to the specified face, among the faces included in the captured image.

5. The imaging device according to claim 4, wherein the operations further comprise:

group detection processing that detects a first face being adjacent to the specified face in a first direction and looking in a direction of the specified face and detects a group including the specified face and the first face;

second face detection processing that detects a second face being adjacent to the first face in the first direction;

first group addition processing that adds the second face to the group in a case where the second face looks in the direction of the specified face and, by setting the second face as a new first face, detects a second face through the first face detection processing;

third face detection processing that detects a third face being adjacent to the specified face in a second direction different from the first direction and looking in the direction of the specified face and adds the third face to the group in a case where the second face does not look in the direction of the specified face or the second face is not detected;

fourth face detection processing that detects a fourth face being adjacent to the third face in the second direction; and second group addition processing that adds the fourth face to the group in a case where the fourth face looks in the direction of the specified face and, by setting the fourth face as a new third face, detects a fourth face through the fourth face detection processing.

6. The imaging device according to claim 1, wherein detecting, as a provisional group, a set of faces each of which is located within a predetermined distance to an adjacent face and has a size within a predetermined range relative to an adjacent face, and detects the group from the respective faces included in the provisional group.

7. The imaging device according to claim 6, wherein detecting, as the group, a set of faces on both ends of the provisional group and a smaller face in size than the faces on both ends, among the set of faces included in the provisional group.

8. The imaging device according to claim 6, wherein detecting the group based on directions of respective faces relative to an imaginary line sequentially connecting the respective faces being adjacent to one another included in the provisional group.

9. An imaging device, comprising:

an imaging unit configured to image an object and output a captured image;

a memory that is configured to store computer executable instructions; and a processor that is configured to execute the computer executable instructions to perform operations, comprising:

imaging an object and outputting a captured image;

recognizing a face included in the captured image and detecting a direction and a position of the recognized face;

detecting a group formed by the faces included in the captured image based on directions and positions of two faces being adjacent to each other among the faces included in the captured image;

outputting a control signal indicating a direction of the group;

controlling an angle view for imaging; and controlling an imaging direction of the imaging unit based on the control signal such that the face included in the group is included in the captured image, wherein controlling the angle of view based on the control signal such that the face included in the group is included in the captured image;

controlling the angle of view based on the control signal such that the faces included in a plurality of groups detected are included in the captured image in a case where the plurality of the groups are detected in the captured image; and controlling the imaging direction based on the control signal to switch among the plurality of the groups one by one in a case where the detecting detects the plurality of the groups in the captured image and all faces included in the plurality of the groups detected by the detecting are not included in the captured image when controlling the angle of view to enlarge to a predetermined angle of view.

10. An imaging device, comprising:

an imaging unit configured to image an object and output a captured image;

a memory that is configured to store computer executable instructions; and a processor that is configured to execute the computer executable instructions to perform operations, comprising:

imaging an object and outputting a captured image;

recognizing a face included in the captured image and detecting a direction and a position of the recognized face;

detecting a group formed by the faces included in the captured image based on directions and positions of two faces being adjacent to each other among the faces included in the captured image;

outputting a control signal indicating a direction of the group; and controlling an angle view for imaging, wherein controlling the angle of view based on the control signal such that the face included in the group is included in the captured image; and applying low-pass filter processing to a timing for detecting change in the direction of the face included in the detected group.

11. A method for controlling an imaging device, comprising:

imaging an object and outputting a captured image;

recognizing a face included in the captured image and detecting a direction and a position of the recognized face;

detecting a group formed by the faces included in the captured image based on directions and positions of two faces being adjacent to each other among the faces included in the captured image;

outputting a control signal indicating a direction of the group;

controlling an angle of view for imaging; and controlling an imaging direction based on the control signal such that the face included in the group is included in the captured image, wherein controlling the angle of view based on the control signal such that the face included in the group is included in the captured image, and controlling the imaging direction based on the control signal to switch among the plurality of the groups one by one in a case where the detecting detects the plurality of the groups in the captured image.

12. A method for controlling an imaging device, comprising:

imaging an object and outputting a captured image;

recognizing a face included in the captured image and detecting a direction and a position of the recognized face;

detecting a group formed by the faces included in the captured image based on directions and positions of two faces being adjacent to each other among the faces included in the captured image;

outputting a control signal indicating a direction of the group;

controlling an angle view for imaging; and controlling an imaging direction based on the control signal such that the face included in the group is included in the captured image, wherein controlling the angle of view based on the control signal such that the face included in the group is included in the captured image;

controlling the angle of view based on the control signal such that the faces included in a plurality of groups detected are included in the captured image in a case where the plurality of the groups are detected in the captured image; and controlling the imaging direction based on the control signal to switch among the plurality of the groups one by one in a case where the detecting detects the plurality of the groups in the captured image and all faces included in the plurality of the groups detected by the detecting are not included in the captured image when controlling the angle of view to enlarge to a predetermined angle of view.

13. A method for controlling an imaging device, comprising:

imaging an object and outputting a captured image;

recognizing a face included in the captured image and detecting a direction and a position of the recognized face;

detecting a group formed by the faces included in the captured image based on directions and positions of two faces being adjacent to each other among the faces included in the captured image;

outputting a control signal indicating a direction of the group; and controlling an angle view for imaging, wherein controlling the angle of view based on the control signal such that the face included in the group is included in the captured image, and applying low-pass filter processing to a timing for detecting change in the direction of the face included in the detected group.

* * * * *